(12) United States Patent
Nonaka et al.

(10) Patent No.: US 8,531,794 B2
(45) Date of Patent: Sep. 10, 2013

(54) PATTERNED MEDIA WITH AN ALTERNATING SERIES OF CONCENTRIC SERVO ZONES AND OVERLAP ZONES

(75) Inventors: Keiichiro Nonaka, Fujisawa (JP); Kei Yasuna, Fujisawa (JP); Masahito Kobayashi, Ushiku (JP)

(73) Assignee: HGST Netherlands, B.V., Amsterdam (NL)

( * ) Notice: Subject to any disclaimer, the term of this patent is extended or adjusted under 35 U.S.C. 154(b) by 223 days.

(21) Appl. No.: 13/177,413

(22) Filed: Jul. 6, 2011

(65) Prior Publication Data
US 2013/0010388 A1  Jan. 10, 2013

(51) Int. Cl.
G11B 5/09  (2006.01)

(52) U.S. Cl.
USPC ............... 360/55; 360/48; 360/49; 360/77.08

(58) Field of Classification Search
None
See application file for complete search history.

(56) References Cited

U.S. PATENT DOCUMENTS

| | | |
|---|---|---|
| 5,440,474 A | 8/1995 | Hetzler |
| 5,541,784 A | 7/1996 | Cribbs et al. |
| 5,766,718 A | 6/1998 | Matsuda et al. |
| 6,178,056 B1 | 1/2001 | Cloke et al. |
| 6,490,111 B1 | 12/2002 | Sacks |
| 6,643,082 B1 | 11/2003 | Belser |
| 6,680,079 B1 | 1/2004 | Stirniman et al. |
| 6,753,043 B1 | 6/2004 | Kuo et al. |
| 6,765,744 B2 | 7/2004 | Gomez et al. |
| 6,821,627 B2 | 11/2004 | Stirniman et al. |
| 7,012,773 B2 | 3/2006 | Ashikaga et al. |
| 7,102,840 B2 | 9/2006 | Sado |
| 7,230,790 B1 | 6/2007 | Mallary et al. |
| 7,262,932 B2 | 8/2007 | Asakura |
| 7,405,893 B2 * | 7/2008 | Bi et al. ............ 360/77.08 |
| 7,417,826 B2 | 8/2008 | Hattori et al. |
| 7,466,506 B1 | 12/2008 | Albrecht et al. |
| 7,573,669 B2 | 8/2009 | Saikawa et al. |
| 7,646,561 B2 | 1/2010 | Takasaki et al. |
| 7,652,839 B2 | 1/2010 | Albrecht et al. |

(Continued)

FOREIGN PATENT DOCUMENTS

JP    2006031853    2/2006

OTHER PUBLICATIONS

Lin et al, "Investigation of advanced position error signal patterns in patterned media," Journal of Applied Physics, vol. 87, No. 9, May 1, 2000, © 2000 American Institute of Physics.

(Continued)

*Primary Examiner* — Muhammad N Edun
(74) *Attorney, Agent, or Firm* — Duft Bornsen & Fettig, LLP

(57) ABSTRACT

Embodiments described herein provide for patterned media concentric zones with an alternating series of concentric servo zones and overlap zones. The overlap zones facilitate the writing of servo data between servo zones of different servo frequency. The overlap zones may be dual frequency zones. The dual frequency zones have a first set of overlap patterns with the substantially identical pattern as the bordering lower frequency servo zone and a second set of overlap patterns with the substantially identical pattern as the bordering higher frequency servo zone. A bootstrap zone can be included near the inner diameter to assist initial servo writing. Alternatively the overlap zones are bootstrap zones. Such bootstrap zones have both bootstrap patterns and overlap patterns, the overlap patterns have the substantially identical pattern as a bordering servo zone. Bootstrap patterns only require DC magnetization for servo operability.

24 Claims, 17 Drawing Sheets

(56) References Cited

U.S. PATENT DOCUMENTS

| | | |
|---|---|---|
| 7,675,699 B2 | 3/2010 | Albrecht |
| 7,706,092 B2 | 4/2010 | Ling et al. |
| 7,715,138 B1 | 5/2010 | Kupferman |
| 7,751,144 B1 | 7/2010 | Sutardja |
| 2005/0013971 A1 | 1/2005 | Nam |
| 2006/0271227 A1 | 11/2006 | Popp et al. |
| 2006/0275692 A1 | 12/2006 | Okawa |
| 2006/0279871 A1 | 12/2006 | Albrecht et al. |
| 2006/0280975 A1 | 12/2006 | Albrecht et al. |
| 2007/0031706 A1 | 2/2007 | Okawa |
| 2007/0224339 A1 | 9/2007 | Kamata |
| 2008/0026701 A1 | 1/2008 | Albrecht et al. |
| 2008/0170234 A1 | 7/2008 | Kim |
| 2008/0171234 A1 | 7/2008 | Imamura |
| 2008/0186616 A1 | 8/2008 | Matsuura |
| 2008/0239906 A1 | 10/2008 | Akagi et al. |
| 2008/0304172 A1* | 12/2008 | Bi et al. ............ 360/48 |
| 2011/0188149 A1 | 8/2011 | Albrecht et al. |
| 2011/0279924 A1* | 11/2011 | Albrecht et al. ......... 360/75 |

OTHER PUBLICATIONS

Che et al, "Study of Lithographically Defined Data Track and Servo Patterns," IEEE Transactions on Magnetics, vol. 43, No. 12, Dec. 2007.

Hamaguchi et al, "An accurate head-positioning signal for perpendicular recording using a dc-free servo pattern," Journal of applied physics, vol. 91, No. 9, May 2002, © 2000 American Institute of Physics.

Moneck et al., "Lithographically Patterned servo position error signal patterns in perpendicular disks," Journal of Applied Physics 103, 07C511 (2008), © 2008 American Institute of Physics.

NiShikawa et al., "Potential of Servo Pattern Printing on PMR Media with High-Density Servo Signal Pattern," EEE Transactions on Magnetics, vol. 42, No. 10, Oct. 2006 pp. 2612-2614.

* cited by examiner

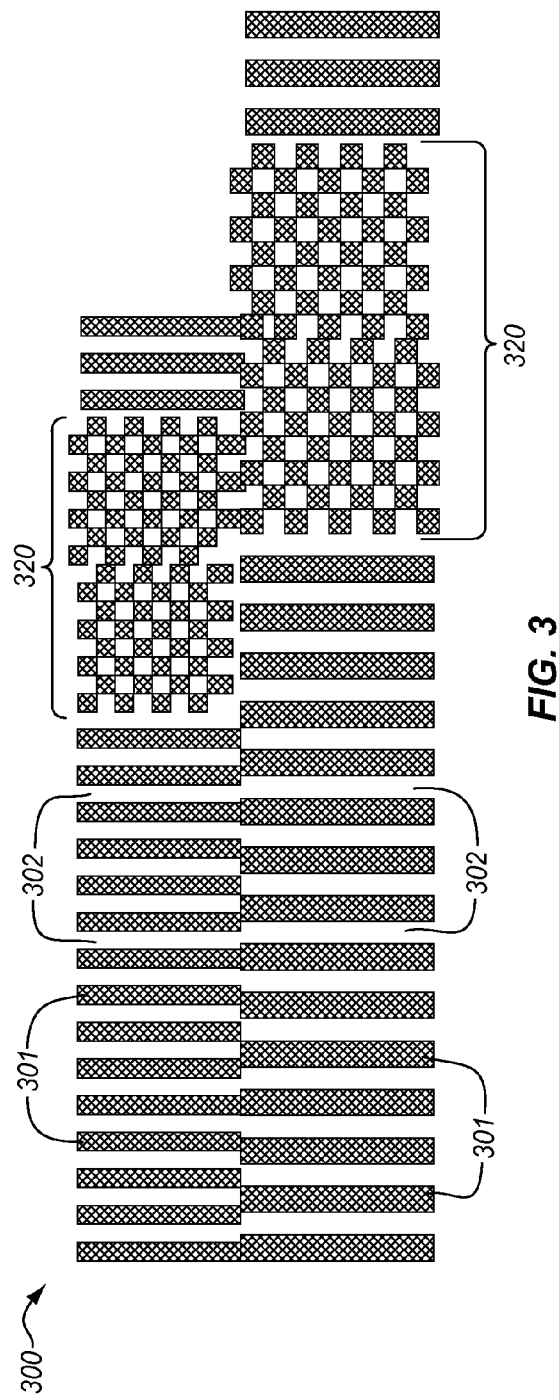
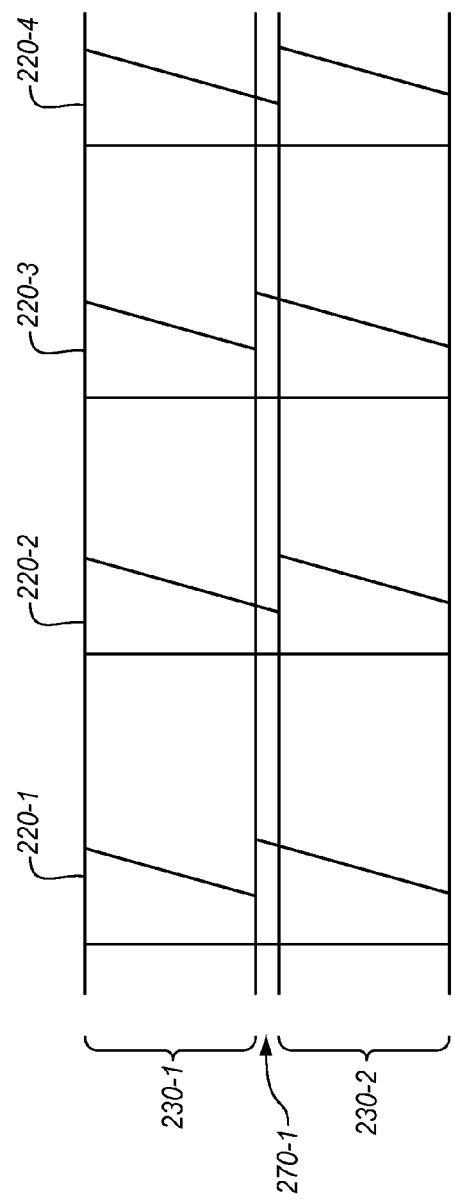

PATTERNED MEDIA WITH AN ALTERNATING SERIES OF CONCENTRIC SERVO ZONES AND OVERLAP ZONES

FIELD OF THE INVENTION

The invention relates to the field of disk drive systems and, in particular, to servo patterns imprinted on a patterned magnetic disk to align a slider with data on the magnetic disk.

BACKGROUND

Many computing systems use disk drive system systems for mass storage of information. Magnetic disk drives typically include one or more sliders that include a read head and a write head. An actuator/suspension arm holds the slider above a magnetic disk. The magnetic disk includes data regions and servo sectors. A voice coil motor ("VCM") moves the actuator/suspension arm to position the slider over selected magnetically written data with the feedback of servo data. Electronics on the disk drive system include a write driver, a read signal preamplifier, a read-write channel, a controller, and firmware. The controller typically is an assortment of circuit chips connected on a printed circuit board. The controller includes one or more microprocessors, memory, servo control circuits, hard disk control circuits, spindle motor drivers, and VCM drivers. The read-write channel can include analog to digital conversion circuits, data clocks, servo clocks, and phase locked loops.

Both the data regions and servo sectors can include information that is magnetically written by the write head onto the magnetic disk and also read back by the read head from the magnetic disk. The data regions include data tracks that are available to store end-user files and disk drive system parameter data (or maintenance data). The data is written typically in 512 byte or 4 kilobyte data blocks. Each data block usually has a data sync field, the actual data (typically encoded and possibly encrypted), and error correction data. The end-user is free to store new data and later modify the data.

The servo sectors include servo data that is used to position the slider. Servo data is typically only written at the manufacturing facility and cannot be changed by the end-user. There are various techniques for writing servo data on a magnetic disk; in a typical method called self-servo writing the servo data is step-wise propagated from the inner diameter to the outer diameter using the write head to write servo data that is later used for servo track following to assist the writing of additional servo data. One complicating factor for self-servo writing (as well as normal data writing) is the radial read-write offset length ("RWO") between the write head and the read head. The RWO changes with the slider's angular position over the magnetic disk based on the location of the read head and write head on the slider and the arc made by the actuator over the magnetic disk. Often in self-servo writing, the read head is offset toward the inner diameter from the write head and the servo data is written from the inner diameter to the outer diameter.

FIGS. 18A-18C illustrate a close-up view of a slider's 122 variable angular position over a magnetic disk. As mentioned, the slider 122 is configured with a read head 130 and a write head 140 that are operable to read from and write to the magnetic disk. When the slider 122 is positioned towards the inner diameter of the magnetic disk, the RWO 900 between the read head 130 and the write head 140 is at its smallest dimension relative to the magnetic disk. As the slider 122 moves to the center of the magnetic disk, the RWO increases (RWO 901 of FIG. 18B), reaching its maximum RWO (902) at the outer diameter of the magnetic disk in FIG. 18C.

Servo data may include a synchronization field (servo sync), a sector address mark ("SAM"), sector-ID, track-ID (sometimes called the cylinder-ID), a servo burst, a repeatable runout ("RRO") value, and a pad. Data tracks are usually identified by a combination of the track-ID, servo burst, and/or RRO value.

The servo sync is typically the first servo data read by the read head as it passes through a servo sector. The servo sync can be used by the read-write channel to establish servo frequency and servo clock phase. Portions of the servo sync can also be used for automatic gain control in the disk drive system electronics. The servo sync can be written with either a single magnetic polarity or with an alternating polarity as demonstrated in U.S. Patent Application Pub. No. 2006/0279871A1. The servo sync is sometimes referred to as a preamble.

The servo frequency in conventional disk drive systems is constant from the inner diameter to the outer diameter of the magnetic disk. As a result of this constant frequency, the servo sectors increase in circumferential length proportional to radial location. For instance, the circumferential length of the servo sector at the outer diameter of the magnetic disk may be about twice the length of the servo sector at the inner diameter.

If a zoned servo architecture is employed, the servo frequency increases between servo zones from the inner diameter of the magnetic disk to the outer diameter. The servo frequency changes between the zones roughly with the mean radius of each servo zone. The servo frequency within each zone usually remains constant. Because the servo sector is broken into shorter radial servo zones, the circumferential length of the servo sectors does not vary as much as in the conventional servo design. The reduced variance in circumferential length when using zoned servo provides an advantage when using patterned media as the servo patterns for zoned servo can be more uniform in circumferential length from the inner diameter of the magnetic disk to the outer diameter. See U.S. patent application Ser. No. 12/699,581 ("the '581") and the description below of Dry Planarization Design Rules #1 and #2.

Examples of zoned servo can be found in U.S. Pat. No. 6,178,056 FIGS. 2B and 2C; U.S. Pat. No. 7,012,773 FIGS. 10, 15, 20, 28 and column 11 ("the '773"); and U.S. Pat. No. 7,715,138 FIG. 2A. The '773 FIG. 10 demonstrates a design with a series of concentric zones making up an alternating series of normal servo zones that are single frequency ("servo zones") and overlap zones that are dual frequency ("dual frequency zones"). In the dual frequency zones, half of the servo sectors use a first servo frequency that is the same as the bordering lower frequency servo zone while the remaining servo sectors use a second servo frequency that is the same as the bordering higher frequency servo zone. In the '773 FIG. 10 design, the servo zones and dual frequency zones are arranged in continuous radial servo sectors. FIGS. 15, 20, and 25 of the '773 demonstrate other possible zoned servo arrangements in which the servo sectors are not radially continuous.

The SAM (also called a servo address mark, start of servo mark, and servo sync byte) acts as a starting point from which to locate other servo data. For instance, the track-ID, sector-ID, and servo burst can be positioned a predefined distance from the SAM in a predefined order. The SAM is typically a unique magnetic shape so that it is more easily distinguishable by the disk drive system electronics from other magnetic information written on the magnetic disk. The SAM may not follow the same rules or constraints as other data that is written on the magnetic disk. For instance, the SAM may be written at a different frequency or otherwise differ in width and/or spacing from the other servo data.

The sector-ID is used to identify the particular servo sector as the slider circles a track. A track may have 250 or more sequential servo sectors. The sector-ID provides the controller with the circumferential position of the slider. The sector-ID is typically substantially identical in each track of an individual servo sector as it propagates radially from inner diameter to outer diameter. The sector-ID may be a unique digital number identifying the specific servo sector, such as a sector-ID between one and 250 if there are 250 servo sectors in one track. The sector-ID may be split between several servo sectors to reduce the circumferential length of each servo sector; in this case, several servo sectors need to be read to determine the complete sector-ID. In some designs, the magnetic disk has a start of track mark and the controller includes a counter; in this case, a start of track mark resets the counter and the counter is incremented each time new a SAM is encountered by the read head to provide a running count for the complete sector-ID. In this specification, the term sector-ID is meant to include each of these possible designs.

The track-IDs are used to identify the particular radial position as the slider moves radially from the inner diameter to outer diameter. The track-ID is often written in a gray code digital format; there are many gray code formats and some formats encrypt the track-ID and/or provide error-correction redundancy. The track-ID can also be written using a plurality of phase patterns (e.g., chevron patterns), as demonstrated in FIGS. 4A, 4B, 8, and 10 of U.S. patent application Ser. No. 12/634,240 ("the '240"). The track-ID provides the controller with the radial position of the slider. The track-IDs can ascend in numerical value within a specific servo sector from inner diameter to outer diameter; the track-ID can be substantially identical within the sequential servo sectors of a specific track. The track-ID may be a unique digital number identifying the specific radial position, such as a number between one and 100,000 if there are 100,000 unique gray code numbers in the servo sector from the inner diameter to the outer diameter. There is usually not a one to one correspondence between magnetically written data tracks and gray code track-IDs. The track-ID may also be split between several servo sectors to reduce the circumferential length of the track-ID in each servo sector; in this case, several servo sectors need to be read to determine the complete track-ID. In this specification, the term track-ID is meant to include each of these possible designs.

Servo bursts are used to center the slider on the magnetically written data tracks. The servo bursts are used to create a position error signal used by the controller to make fine adjustments to the slider position and center it over a track. The servo burst can be: (i) an ABCD servo burst as demonstrated in U.S. Pat. No. 6,490,111 FIG. 4; (ii) a checkerboard servo burst as demonstrated in U.S. Pat. No. 6,643,082 FIG. 10 and U.S. Pat. No. 7,706,092 FIGS. 6 and 7; or (iii) a phase servo burst as demonstrated in the '581 FIG. 9 item 804. The '581 is incorporated herein by reference. The servo burst can be written with either a single magnetic polarity or with an alternating polarity as demonstrated in the '871. The read back signal of a servo burst will show a repeating series of isolated pulses generated from each magnetic transition. Checkerboard servo bursts with alternating polarity are often called DC-free null servo burst. Unlike the ABCD servo burst and checkerboard servo bursts, the phase servo bursts are configured with a slope. There is often not a one to one correspondence between the radial dimensions of track-IDs and the servo burst. The signal magnitude of a servo burst read back is typically used by the disk drive system electronics to identify a fraction of track-ID's width. Data tracks are usually identified by a combination of the servo data taken from a read back of the track-ID, servo burst strength, and/or RRO value. There is often not a one to one correspondence between the radial dimensions of a servo burst and a data track.

RRO values are determined usually during manufacturing and stored within the disk drive system for use during operation. If the RRO values are stored within the servo sectors, they are often stored as bits of information located after the servo burst.

Often there is a pad before and/or after the servo data. The pad does not necessarily include any specific data. The pad is used to accommodate read-to-write and write-to-read transition timing of the write driver, read signal preamplifier, and read-write channel.

Patterned magnetic disk designs have emerged recently to enhance the recording density by providing better track and/or bit isolation. For example, nano scale non-magnetic grooves may be patterned on the magnetic disk by removing magnetic material and leaving behind discrete tracks or bit "islands" of magnetic material. There are two common forms of patterned magnetic disk: Discrete Track Media ("DTM") and Bit Patterned Media ("BPM"). In DTM, discrete tracks are patterned into the magnetic disk and data bits are magnetically written thereto. In BPM, individual bits may be patterned via track grooves and crossing bit grooves, creating islands of magnetic material. Both BPM and DTM establish data patterns where data may be magnetically written. Read back of pattern media will show magnetic transitions between the magnetized magnetic islands and non-magnetic grooves, such as in BPM; read back of pattern media will also show magnetic transitions occurring within a single magnetic island, such as in DTM. (Note that, unlike DTM or BPM, conventional non-patterned media has layers of magnetic material sputtered onto the entire front and back surfaces of the magnetic disk and there are typically no pre-formatted patterns).

In both BPM and DTM the disk patterning process can be used to create unique magnetic islands in the shape of various portions of the servo data. In U.S. Pat. No. 6,490,111 ("the '111") FIG. 4, for example, the pattern imprint includes magnetic islands in the shape of all the intended final servo data, including the gray code track-ID. With the '111 design, the servo data is readable by the read head after bulk Direct Current ("DC") magnetization (e.g., single magnetic polarity) of the magnetic islands because of the read back signal contrast between the presence and absence of magnetic material. The problem with this servo data writing approach, however, is that many of the available planarization constraints have difficulty dealing with the widely varying sizes and shapes of the gray code track-ID formats and sector-ID formats. Certain planarization constraints impose design rules on patterned magnetic disk. For liquid-based planarization, all non-magnetic grooves should be configured at or below a specified width that allows for the liquid to planarize the grooves through capillary forces. For dry planarization, such as vacuum deposit/etchback planarization, the ratio of magnetic island widths to non-magnetic groove widths needs to be constant everywhere ("Dry Planarization Design Rule #1"). It is also advantageous to ensure that magnetic island and non-magnetic groove widths are constant everywhere ("Dry Planarization Design Rule #2"). Servo patterns that comply with these planarization constraints are sometimes called planarization compatible servo ("PCS") or planarization-compatible servo pattern ("PSP").

An alternative approach to bulk DC magnetization of pre-patterned gray code track-ID, is to hard pattern only a portion of the servo data on the magnetic disk and fill in the remaining servo data by magnetically writing with the write head the desired servo data into the remaining portions of the servo pattern. This process has been called assisted servo track write for patterned media. In the '581, for instance, the servo pattern includes a single servo write assist pattern and a plurality of checkerboard sub-patterns. The servo write assist pattern is comprised of radial magnetic islands and radial non-magnetic grooves. The servo write assist pattern can also, as demonstrated in FIG. 6 of the '111, be comprised of circumferential magnetic rows and circumferential non-magnetic grooves. After assembly of the patterned magnetic disk into a disk drive system, the write head is used to magnetically write the track-ID in the servo write assist patterns. The writing of the track-ID by the write head does not change the shape of the magnetic islands and non-magnetic grooves of the servo write assist patterns.

A hybrid servo writing approach is to combine of small number of bootstrap patterns (which are operable after DC magnetization) and predominant servo write assist patterns (which require magnetic writing by the write head). The bootstrap patterns may include pre-patterned SAM patterns, gray code track-ID patterns, sector-ID patterns, and burst patterns that do not comply with the planarization constraints. The bootstrap patterns may be designed to comply with planarization constraints by using phase patterns (e.g., chevrons), such as shown in FIGS. 4A, 4B, 8, and 10 of the '240. With either pre-patterned gray code or phase patterns, the bootstrap patterns are operational after bulk DC magnetization of the magnetic disk. The bootstrap patterns are typically located at the inner diameter of the magnetic disk and used for track following during the servo track writing of an initial set of servo write assist patterns by the write head. After the initial set of servo write assist patterns have been written by the write head using the bootstrap patterns for track following, additional servo write assist patterns can be written by the write head by track following on this initial set. The servo write assist patterns comply with the planarization constraints. See, for example: U.S. patent application Ser. No. 12/800,300 FIGS. 4 and 5; and the '581 FIGS. 3, 5, 8, and 9. These references, however, do not address how best to write servo data across servo zone boundaries. Accordingly, there exists a need to provide a zoned servo architecture that enables robust servo writing beyond the writing of initial servo data, particularly addressing the need to write servo data across servo zone boundaries.

SUMMARY

Embodiments described herein provide for patterned media concentric zones with an alternating series of concentric servo zones and overlap zones. The overlap zones facilitate the writing of servo data between servo zones of different servo frequency. In one embodiment, the overlap zones are dual frequency zones. The dual frequency zones have a first set of overlap patterns with the substantially identical pattern as the bordering lower frequency servo zone and a second set of overlap patterns with the substantially identical pattern as the bordering higher frequency servo zone. A bootstrap zone can be included near the inner diameter to assist initial servo writing. In another embodiment, the overlap zones are bootstrap zones. All bootstrap zones have both bootstrap patterns and overlap patterns, the overlap patterns have the substantially identical pattern as a bordering servo zone. Bootstrap patterns only require DC magnetization for servo operability.

If the bootstrap patterns do not comply with planarization constraints, their short radial and circumferential length prevents significant disruption to flight of the slider over the magnetic disk. The bootstrap patterns may also be designed to comply with planarization constraints by using phase patterns; multiple phase patterns can provide a substitute track-ID pattern. The overlap patterns require the writing of servo data within the overlap patterns using the write head for servo operability, but overlap patterns comply with the planarization constraints. The radial overlap length of the overlap zones are set to be greater than the RWO. The overlap zones can include extended sync patterns that are paired with data sync patterns in a bordering servo zone.

For the dual frequency zone embodiment, the servo patterns and overlap patterns may be arranged in servo sectors that propagate from the inner diameter of the magnetic disk to the outer diameter (e.g., either in an arcuate or generally straight fashion). In the overlap zones, these servo sectors can be alternating frequencies. The odd servo sectors, for instance, can include lower frequency overlap patterns while the even servo sectors can include higher frequency overlap patterns. The overlap patterns can be the substantially identical pattern as the bordering servo zones and/or the substantially identical servo frequency.

The radial overlap length of the overlap zones can accommodate the RWO of the slider. As discussed, the RWO changes with the slider's angular position over the magnetic disk based on the location of the read head and write head on the slider and the arc made by the actuator over the magnetic disk. The radial overlap length of the overlap zones can be adaptable such that the radial overlap length of each overlap zone is long enough to accommodate the maximum RWO in each overlap zone. The radial overlap length can also be some multiple of the maximum RWO for each overlap zone to accommodate manufacturing tolerances. To simplify the magnetic disk pattern design, the radial overlap length of the overlap zones can be a fixed length that is greater than the maximum RWO for all the overlap zones of the entire magnetic disk.

The overlap zones can also include extended sync patterns. The extended sync patterns can be read by the read head when the write head is passing over data patterns located outside the overlap zones. The read head signal establish data clock synchronization that is used to establish the correct write head signal frequency. The extended sync patterns can immediately follow the overlap patterns. These extended sync patterns therefore add further data capacity to the magnetic disk. The servo zones bordering the overlap zones may be subdivided into sub-zones with different data frequencies. E.g., each servo zone may have multiple sub-zones with each sub-zone having its own data frequency.

The maximum radial length of each servo zone is a function of the planarization constraints and the geometry of the magnetic disk. E.g., the circumference changes less with each additional centimeter of radius at the outer diameter of the magnetic disk when compared to the change in circumference near the inner diameter.

Each of the above embodiments may be implemented with a disk drive system and used to facilitate servo writing to the magnetic disk. In some embodiments, methods also provide for servo writing based on the patterned magnetic disk embodiments. Other exemplary embodiments may be described below.

DESCRIPTION OF THE DRAWINGS

Some embodiments of the present invention are now described, by way of example only, and with reference to the accompanying drawings. The same reference number represents the same element or the same type of element on all drawings.

FIG. 3 illustrates the detailed view of the boundary area between patterns with different frequencies in an exemplary embodiment.

FIG. 4 illustrates a block diagram of two servo zones bordering an overlap zone in an exemplary embodiment.

DESCRIPTION OF THE EMBODIMENTS

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
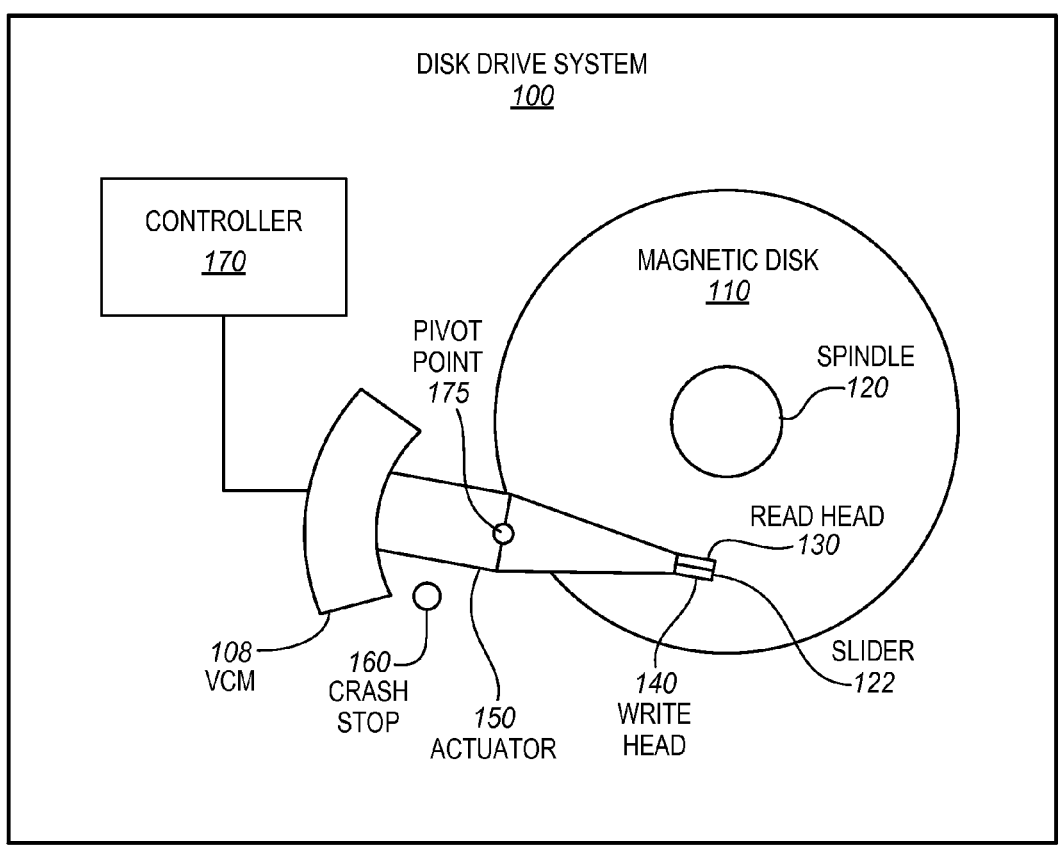
FIG. 1 illustrates a disk drive system in an exemplary embodiment.

FIG. 1 illustrates a simplified overhead view of a typical disk drive system 100, which is suitable to include a magnetic disk 110, as exemplarily described herein. In the disk drive system 100, the magnetic disk 110 is rotatably mounted upon a motorized spindle 120. A slider 122, having a read head 130 and a write head 140 fabricated thereon, is mounted upon an actuator 150 to "fly" above the surface of the rotating magnetic disk 110. The disk drive system 100 may also include a controller 170 that controls and drives a positional voltage to a VCM 108 to control the position of the actuator 150. The disk drive system 100 may also include an inner diameter crash stop 160 to hold the read head 130 and the write head 140 still at a fixed radius relative to the center of the magnetic disk 110. For example, the actuator 150 pivots about the pivot point 175 against the crash stop 160 to prevent the read head 130 and the write head 140 from traveling past a certain point at the inner diameter. The disk drive system 100 may include other components (e.g., a spindle motor used to rotate the magnetic disk 110) that are not shown for the sake of brevity. Additionally, certain components within the disk drive system 100 may be implemented as hardware, software, firmware, or various combinations thereof.

In conventional servo writing, a circular track pattern is created by pushing the actuator 150 of the disk drive system 100 against the crash stop 160 and then writing a single track pattern or a group of concentric track patterns at increasing radii. Once enough concentric tracks have been written, the read head 130 may sense previously written servo data and allow propagation of new servo tracks (e.g., both servo bursts and track-ID) across the surface of the magnetic disk 110. That is, the read head 130 may track follow over previously written servo data while the offset write head 140 is used to write new servo data over tracks that have not yet been servo written.

With the advent of patterned media, servo writing is presented with new challenges. For example, track trajectory is generally not concentric with the center of rotation of the spindle 120 because it is difficult if not impossible to concentrically align data patterns with the spindle 120.

Zoned Servo

Figure 2:
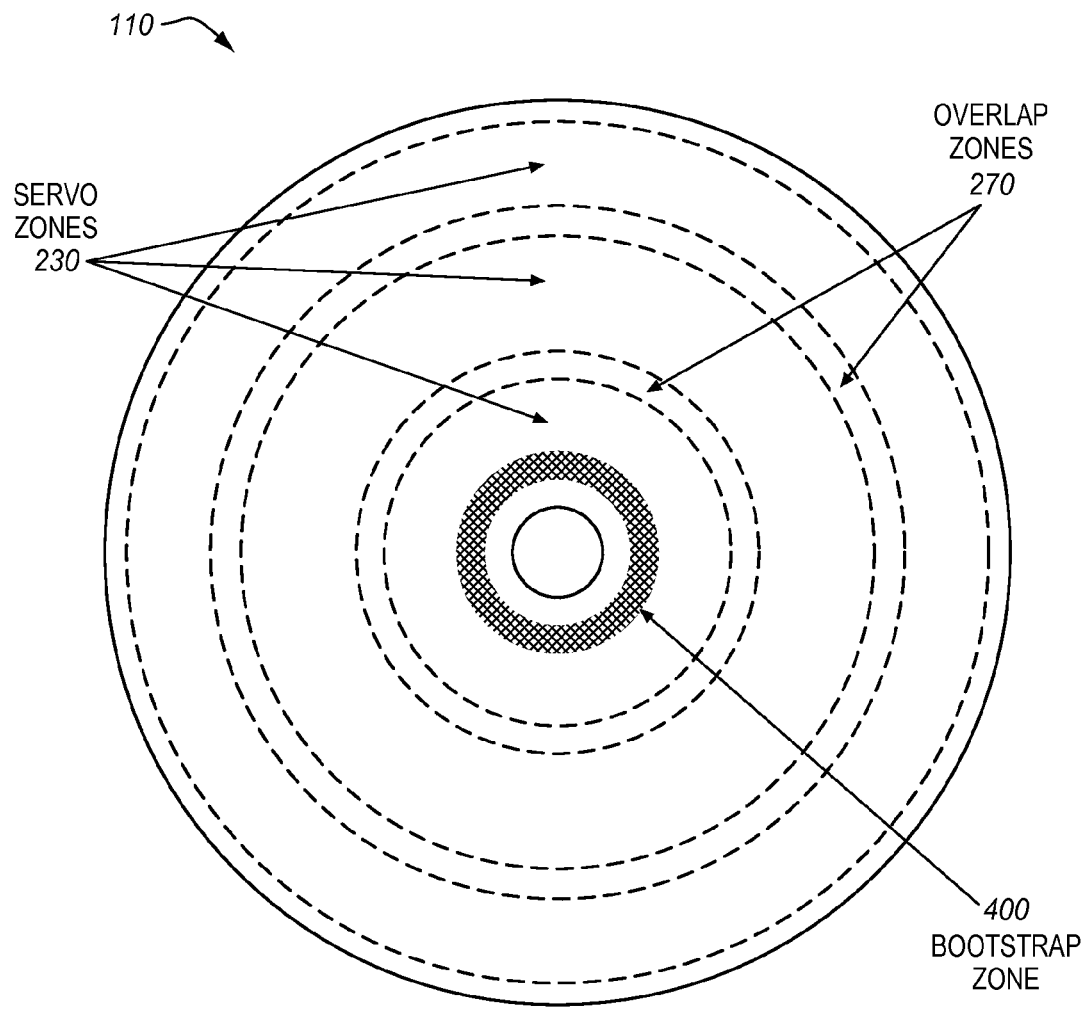
FIG. 2 illustrates a magnetic disk with a bootstrap zone and an alternating series of concentric servo zones and overlap zones in an exemplary embodiment.

FIG. 2 illustrates one example of the magnetic disk 110 employing a bootstrap zone 400 and an alternating series of servo zones 230 and overlap zones 270. Within each of the servo zones 230, the servo frequency can be constant or can be within a range of frequencies. A constant servo frequency in an individual servo zone 230 enhances predictability of the servo frequency, but the circumferential width of the servo patterns generally must increase proportionally to the radius. If the servo frequency is a range of frequencies, then the circumferential width of the servo patterns can be constant within the servo zones 230. The servo frequency is generally different in each servo zone 230 and the servo zones 230 are patterned from the inner diameter of the magnetic disk 110 to the outer diameter according to increasing servo frequency.

The servo zones 230 include both servo patterns and data patterns. Usually, the servo patterns are placed into predictably located servo sectors and the data patterns are placed in data regions between the servo sectors. The data patterns can be arranged into one or more concentric sub-zones within the servo zones 230. The data frequency within each sub-zone can be is constant or can be within a range of frequencies. In this manner, the data frequency can be optimized with more sub-zones while maintaining a simpler servo zone layout. The data frequency within each sub-zone scales roughly with mean radius. The two sub-zones bordering an overlap zone can be the same frequency.

FIG. 4 illustrates the dual frequency zone embodiment. A higher frequency servo zone 230-1 and a lower frequency servo zone 230-2 border the overlap zone 270-1. In the odd servo sectors 220-1 and 220-3, the overlap zone has overlap patterns that are substantially identical to (or substantial identical servo frequency as) the servo patterns of the lower frequency servo zone 230-2. In the even servo sectors 220-2 and 220-4, the overlap zone has overlap patterns that are substantially identical to the servo patterns of the higher frequency servo zone 230-1. To propagate the writing of servo data into the dual frequency servo zone 270-1, the read head can track follow on the lower frequency servo zone 230-2. Once the servo data is written into the overlap patterns of the overlap zone 270-1, the overlap patterns' servo data can be used to propagate the servo data into the higher frequency servo zone 230-1. The servo data can be propagated in the opposite radial direction by track following on the higher frequency servo zone 230-1 to write servo data in the overlap zone 270-1 then track follow using the overlap zone 270-1 servo data to write servo data into the lower frequency servo zone 230-2.

FIG. 3 illustrates the detailed view of the boundary area between patterns 300 with different frequencies in an exemplary embodiment. Note the width differences of the radial magnetic columns 301 and the non magnetic grooves 302 in the boundary area between patterns 300, which results in different servo frequencies of the two patterns. The term "radial" with respect to the columns is intended to designate an orientation of the columns in a relatively straight line from the inner diameter of the magnetic disk 110 to the outer diameter. The actual dimensions of the radial columns may vary but generally conform to the planarization constraints discussed above. The patterns also include burst patterns 320 (shown here as a plurality of checkboard sub-patterns). FIG. 3 shows an embodiment in which the two patterns commence circumferentially together at the leading edge of a servo sector 220.

Figure 5:
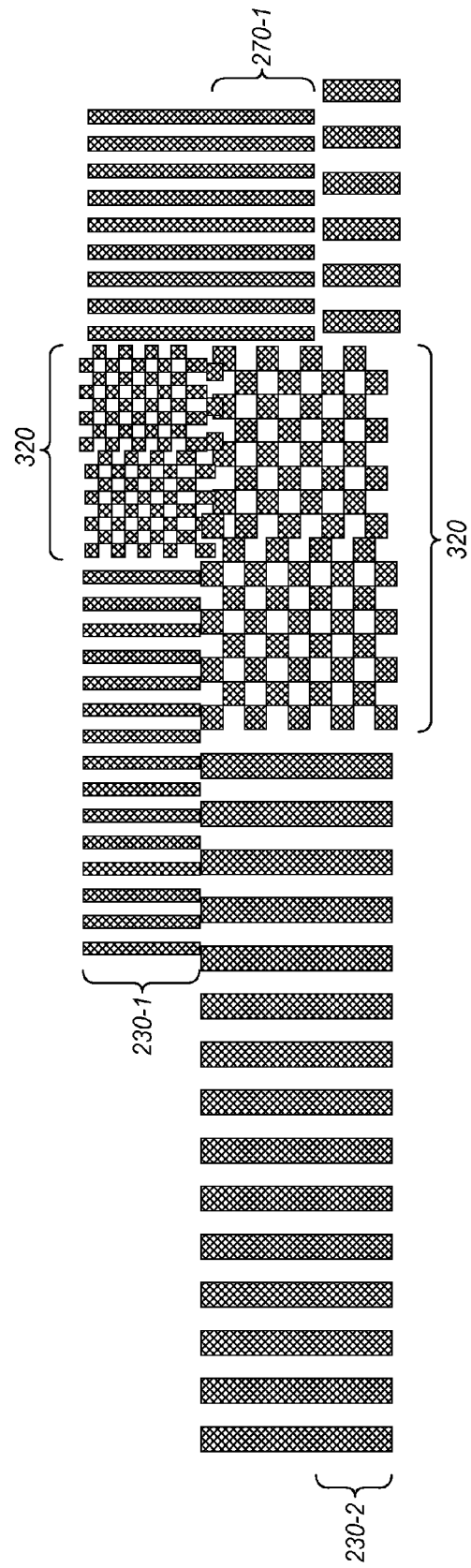
FIG. 5 illustrates a detailed view of the boundary area between patterns with different frequencies in a second exemplary embodiment.

FIG. 5 shows an alternate embodiment where the two patterns are aligned to end circumferentially together. The FIG. 5 embodiment makes possible the pairing of extended sync pattern and data sync patterns. The extended sync patterns commence circumferentially after the burst pattern 320 and extends as a set radially from top to bottom of the overlap zone 270-1. Data sync patterns in the higher frequency servo zone 230-1 are paired with the extended sync patterns of the overlap zone 270-1 and create continuous radial columns. The extended sync pattern will be discussed in more detail below.

Overlap Zones can be Dual Frequency Zones

Figure 6:
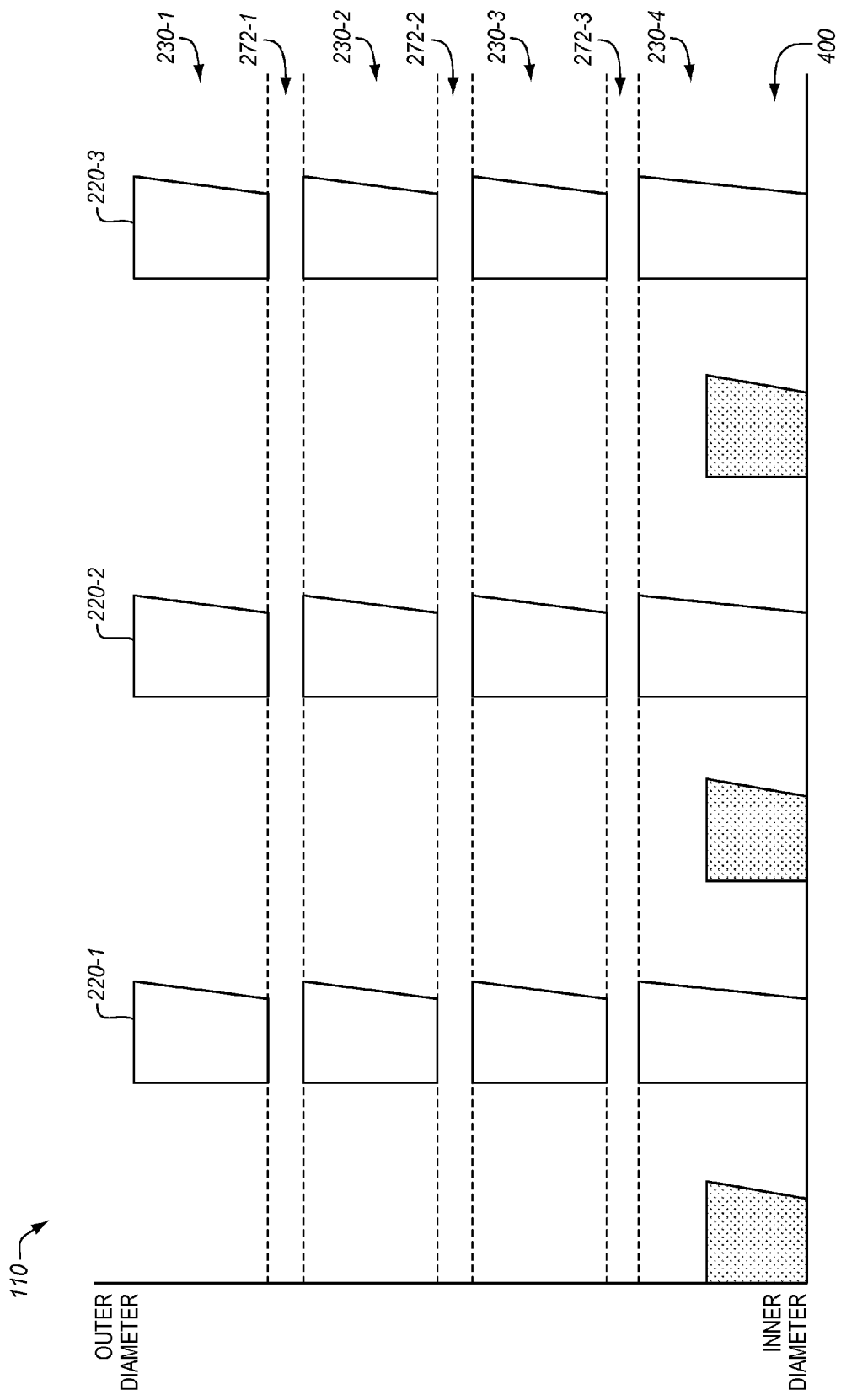
FIG. 6 illustrates alternating servo zones and dual frequency zones along with a bootstrap zone at the inner diameter of the magnetic disk in an exemplary embodiment.

FIG. 6 illustrates alternating servo zones and dual frequency zones along with a bootstrap zone 400 at the inner diameter of the magnetic disk 110 in an exemplary embodiment. E.g., the overlap zones are dual frequency zones. As with FIG. 4, the dual frequency zones 272-1-3 are between servo zones 230-1-4, the servo patterns and overlap patterns are located within servo sectors 220-1-3 on the magnetic disk 110, the overlap patterns in the odd servo sectors 220-1 and 220-3 are substantially identical to (or of the substantially identical servo frequency) as the bordering lower frequency servo zone, and the overlap patterns in the even servo sector 220-2 are substantially identical to (or of the substantially identical servo frequency) as the bordering higher frequency servo zone. In FIG. 6, a bootstrap zone 400 is located near the inner diameter of the magnetic disk 110. The bootstrap zone 400 includes bootstrap patterns interspersed between the servo sectors 220-1-3. The bootstrap patterns may also be interspersed within a subset of the servo sectors, such as all the odd servo sectors 220-1 and 220-3. The bootstrap zone 400 also includes overlap patterns that are substantially identical to (or of the substantially identical servo frequency) as the bordering servo zone 230-4. Within the servo zones 230-1-4, the servo frequency increases from the inner diameter of the magnetic disk 110 to the outer diameter. In this embodiment, the outer diameter radial direction of the magnetic disk 110 is towards the servo zone 230-1. Thus, the servo zone 230-1 has the highest servo frequency in FIG. 6. The overlap patterns in the dual frequency zones 272-1-3, the overlap patterns in the bootstrap zone 400, and the servo patterns in the servo zones 230-1-4 comply with planarization constraints. The region between the servo sectors can include data patterns for a data region.

The bootstrap patterns in the bootstrap zone 400 may include pre-patterned SAM patterns, gray code track-ID patterns, sector-ID patterns, and burst patterns that do not comply with the planarization constraints. With this pre-patterning, the bootstrap patterns are operational after bulk DC magnetization of the magnetic disk. If the bootstrap patterns do not comply with planarization constraints, their short radial and circumferential length prevents significant disruption to flight of the slider over the magnetic disk. The bootstrap patterns may also be designed to comply with planarization constraints by using phase patterns; multiple phase patterns can provide a substitute track-ID pattern, as demonstrated in FIGS. 4A, 4B, 8, and 10 of the '240. The bootstrap patterns provide a starting point for the servo write process. The read head 130 can track follow on the bootstrap patterns to write servo data into the overlap patterns first in the bootstrap zone 400 and then into the beginning of the first servo zone 230-4. To propagate the writing of servo data into the dual frequency servo zone 270-3, the read head can track follow on the lower frequency servo zone 230-4. Once the servo data is written into the overlap patterns of the dual frequency zone 272-3, the servo data (written within the overlap patterns) can be used to track follow while writing new servo data into the higher frequency servo zone 230-3. The servo data can be propagated in the opposite radial direction by placing the bootstrap zone 400 at the outer diameter of the magnetic disk 110 and following the same process outlined above (though in the opposite radial direction). The servo data can also be propagated by placing the bootstrap zone somewhere between the inner and outer diameter of the magnetic disk 110 and starting the servo writing process from this bootstrap zone. Examples of available bootstrap zone locations are shown and described in FIGS. 7-9. Examples of bootstrap patterns are shown and described in FIGS. 11-15. Although shown and described with respect to a certain number of servo sectors 220, associated servo zones 230-1-4, dual frequency zones 272-1-3, and the bootstrap zone 400, the invention is not intended to be so limited as these may be established as a matter of design choice.

Figure 7A:
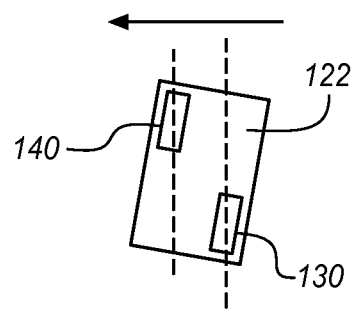
FIGS. 7A and 7B illustrate a close-up view of a slider and its relative position over a bootstrap zone patterned at an outer diameter of the magnetic disk in an exemplary embodiment.
Figure 7B:
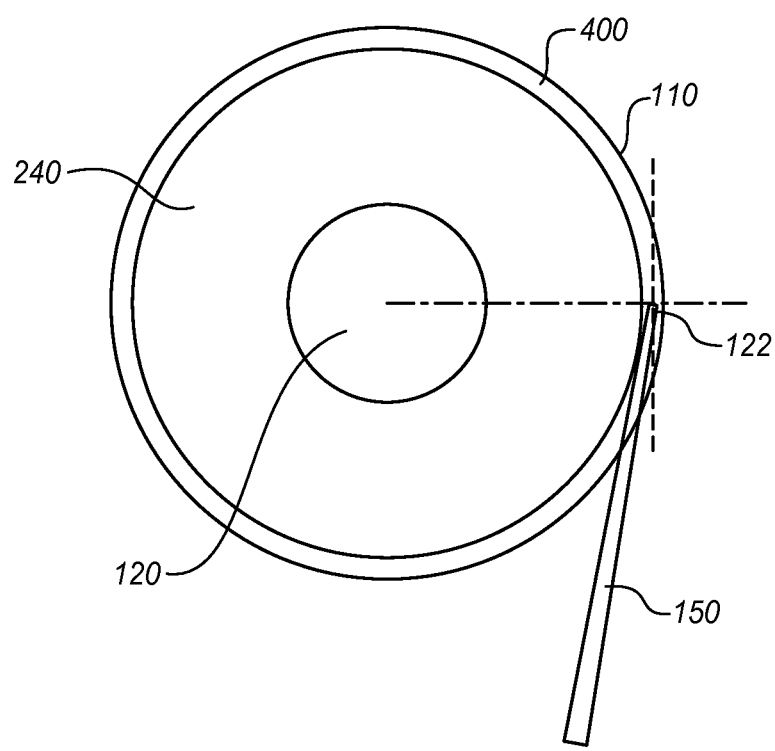
Figure 8A:
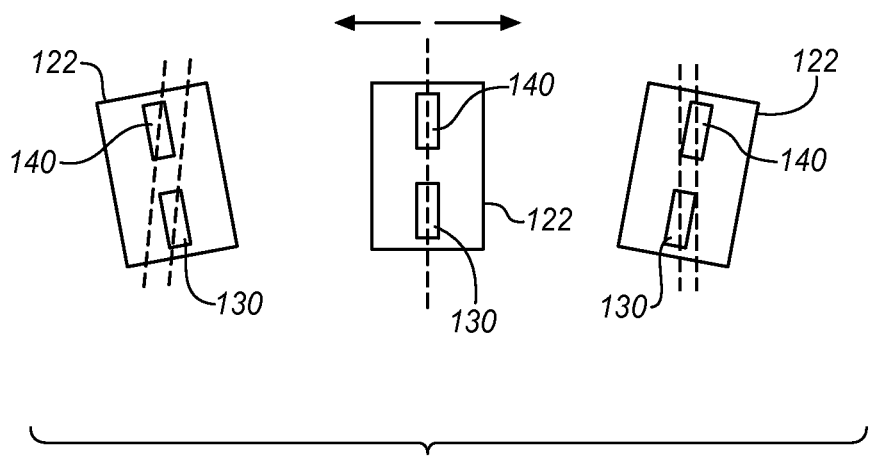
FIGS. 8A and 8B illustrate a close-up view of the slider and its relative position over a bootstrap zone patterned at a middle diameter of the magnetic disk in an exemplary embodiment.
Figure 8B:
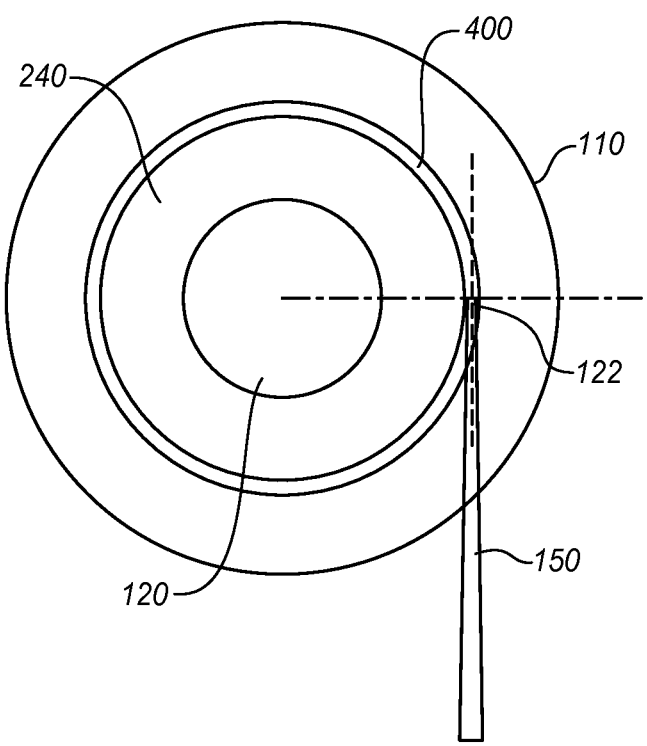
Figure 9A:
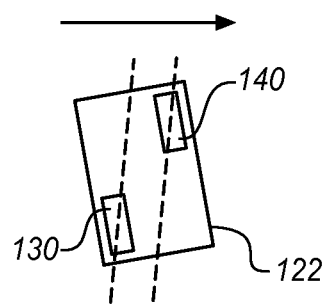
FIGS. 9A and 9B illustrate a close-up view of the slider and its relative position over a bootstrap zone patterned at an inner diameter of the magnetic disk in an exemplary embodiment.
Figure 9B:
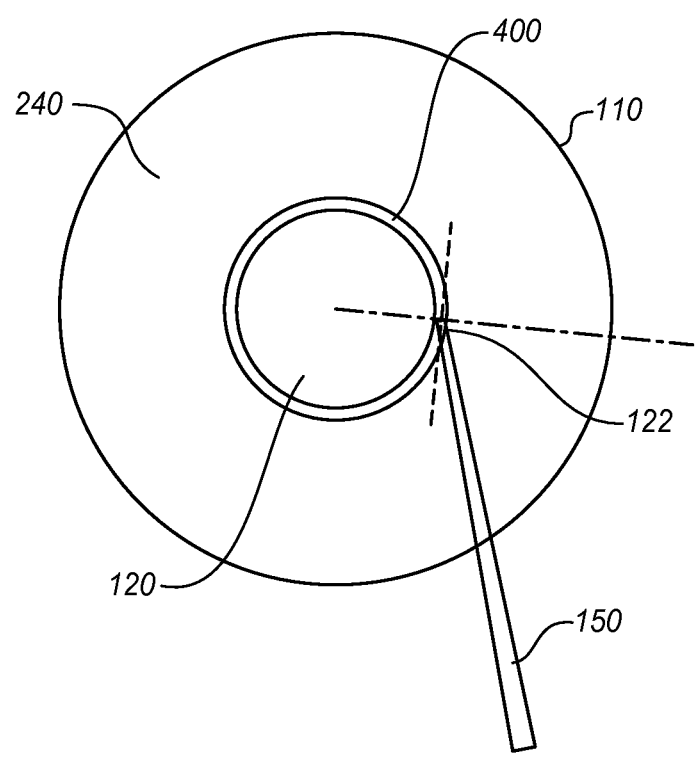

FIGS. 7A and 7B illustrate a close-up view of the slider 122 and its relative position over a bootstrap zone 400 patterned at an outer diameter of the magnetic disk 110 in an exemplary embodiment. FIGS. 8A and 8B illustrate a similar view of the slider 122 and its relative position over a bootstrap zone 400 patterned at a middle diameter of the magnetic disk 110 while FIGS. 9A and 9B illustrate a bootstrap zone 400 patterned at an inner diameter of the magnetic disk 110. Generally, the location of the bootstrap zone 400 depends on the configuration of read head 130 and the write head 140 of the slider 122.

For example, a slider 122 configuration with the read head 130 located more toward the outer diameter of the magnetic disk 110 generally requires that the bootstrap zone 400 be located at the outer diameter, as illustrated in FIGS. 7A and 7B. A slider 122 configuration with the read head 130 located more toward the inner diameter of the magnetic disk 110 generally requires that the bootstrap zone 400 be located at the inner diameter, as illustrated in FIGS. 9A and 9B. Bootstrap zone location in the middle diameter of the magnetic disk 110, as illustrated in FIGS. 8A and 8B are likely less effective as the RWO near the middle diameter must be minimal and alignment tolerances would be tight.

Overlap Zones can be Bootstrap Zones

Figure 10:
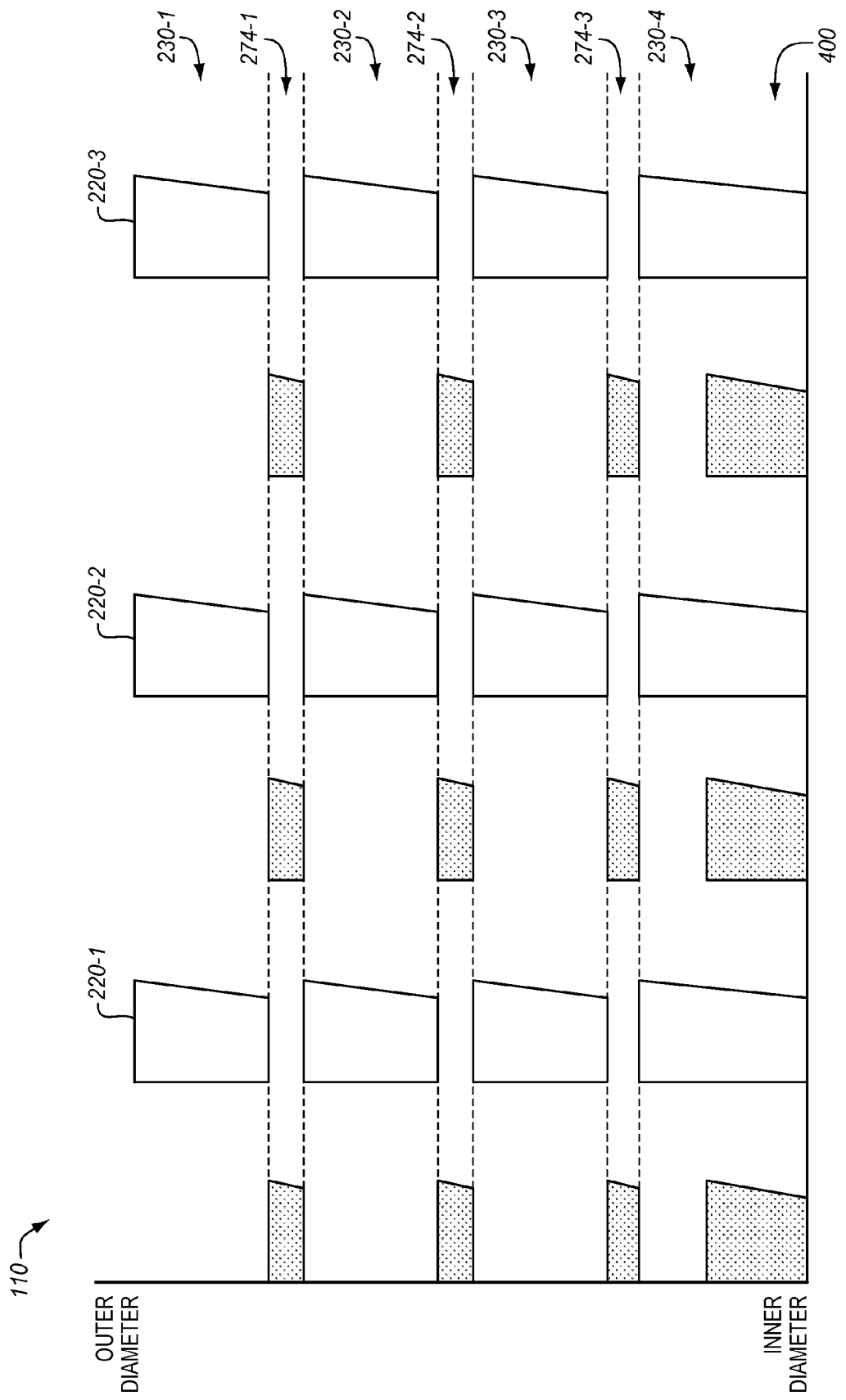
FIG. 10 illustrates alternating servo zones and bootstrap zones in an exemplary embodiment.

FIG. 10 illustrates alternating servo zones and bootstrap in an exemplary embodiment. E.g., the overlap zones are bootstrap zones. As with FIG. 6, the bootstrap zones 274-1-3 are between servo zones 230-1-4, the servo patterns and overlap patterns are located within servo sectors 220-1-3 on the magnetic disk 110, the overlap patterns in the odd servo sectors 220-1 and 220-3 are substantially identical to (or of the substantially identical servo frequency) as the bordering lower frequency servo zone, and the overlap patterns in the even servo sector 220-2 are substantially identical to (or of the substantially identical servo frequency) as the bordering higher frequency servo zone. In FIG. 10, an additional bootstrap zone 400 is located near the inner diameter of the magnetic disk 110. The bootstrap zone 400 includes bootstrap patterns interspersed between the servo sectors 220-1-3. (The bootstrap patterns may also be interspersed within a subset of the servo sectors, such as all the odd servo sectors). The bootstrap zones 400 include also overlap patterns that are substantially identical to (or of the substantially identical servo frequency) as a bordering servo zone 230. Within the servo zones 230-1-4, the servo frequency increases from the inner diameter of the magnetic disk 110 to the outer diameter. In this embodiment, the outer diameter radial direction of the magnetic disk 110 is towards the servo zone 230-1. Thus, the servo zone 230-1 has the highest servo frequency in FIG. 10. The overlap patterns in the bootstrap zones 274-1-3, the overlap patterns in the bootstrap zone 400, and the servo patterns in the servo zones 230-1-4 comply with planarization constraints. The region between the servo sectors can include data patterns.

The bootstrap patterns in the bootstrap zones 274-1-3 and 400 may include pre-patterned SAM patterns, gray code track-ID patterns, sector-ID patterns, and burst patterns that do not comply with the planarization constraints. With this pre-patterning, the bootstrap patterns are operational after bulk DC magnetization of the magnetic disk. If the bootstrap patterns do not comply with planarization constraints, but their short radial and circumferential length prevents significant disruption to flight of the slider 122 over the magnetic disk 110. The bootstrap patterns may also be designed to comply with planarization constraints by using phase patterns; multiple phase patterns can provide a substitute track-ID pattern, as demonstrated in FIGS. 4A, 4B, 8, and 10 of the '240.

The bootstrap patterns provide a starting point for the servo write process both at the beginning of the servo write process and between servo zones of different servo frequency. E.g., at the beginning of the servo write process, the read head 130 can track follow on the bootstrap patterns in the bootstrap zone 400 to write servo data into the overlap patterns first in the bootstrap zone 400 and then into the beginning of the first servo zone 230-4. E.g., the read head 130 can track follow on the bootstrap patterns in the bootstrap zones 274-1-3 to write servo data into the overlap patterns first in the bootstrap zone 274-3 and then into the beginning of the second servo zone 230-3. The servo data can be propagated in the opposite radial direction by placing a bootstrap zone at the outer diameter and following the same process outlined above (though in the opposite radial direction). The servo data can also be propagated by starting the servo write process at a bootstrap zone somewhere between the inner and outer diameter of the magnetic disk 110. Examples of available bootstrap zone locations are shown and described in FIGS. 7-9. Examples of bootstrap patterns are shown and described in FIGS. 11-15. Although shown and described with respect to a certain number of servo sectors 220, associated servo zones 230-1-4, bootstrap zones 274-1-3 and 400, the invention is not intended to be so limited as these may be established as a matter of design choice.

Figure 11:
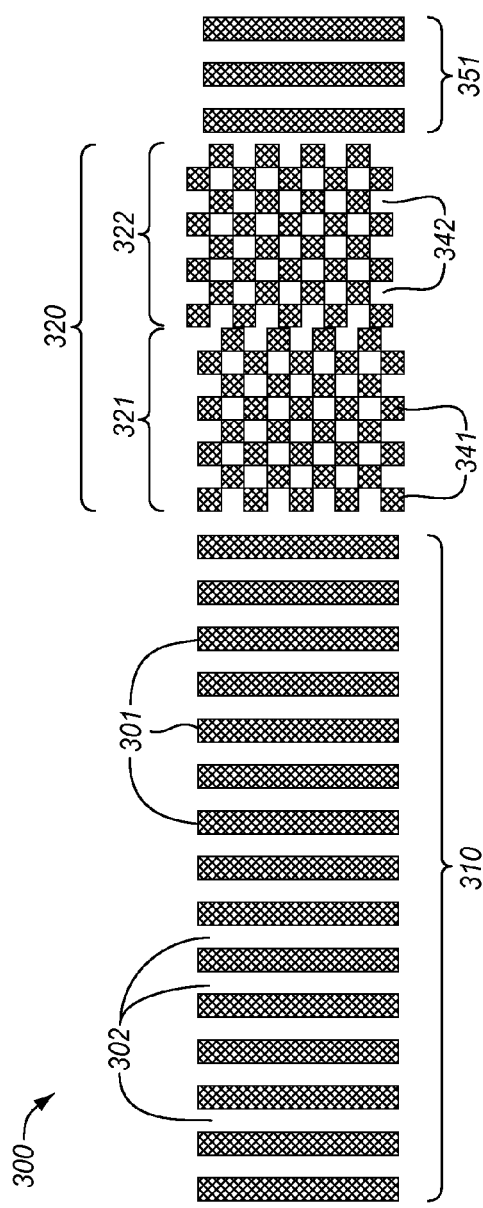
FIG. 11 illustrates a servo pattern in the servo zones of the magnetic disk in an exemplary embodiment.

FIG. 11 illustrates a pattern 300 that can be used as a servo pattern in a servo zone or an overlap pattern in an overlap zone. The pattern 300 of this embodiment includes a plurality of radial magnetic columns 301 patterned on the magnetic disk 110 separated by radial non magnetic grooves 302 (e.g., via the removal of the magnetic material between the radial magnetic columns 301). The radial magnetic columns 301 and radial non magnetic grooves 302 define a servo write assist pattern 310 in which servo data may be written.

The pattern 300 also includes burst pattern 320 comprising a plurality of magnetic islands 341 separated by non magnetic depressions 342, or "valleys", (e.g., again via the removal of the magnetic material between the magnetic islands 341). The burst pattern 320, in this embodiment, comprises a first and second checkerboard sub-pattern 321 and 322, respectively, that are radially offset by some fraction of a magnetic island dimension (e.g., between a quarter to half an island width). The checkerboard sub-patterns 321 and 322 may be substantially symmetric. For example, each of the checkerboard sub-patterns 321 and 322 may comprise about the same size and number of magnetic islands 341. The invention, however, is not intended be limited to the checkerboard sub-patterns 321 and 322 exemplary embodiment as other types of burst patterns may be employed. For example, an ABCD pattern can be configured with four sub-patterns, such as with the A & B patterns at the location of the sub-pattern 321 and the C & D patterns at the location of the sub-patterns 322. Alternatively, the burst pattern 320 may be configured with three or four roughly equal sized checkerboard sub-patterns with each being radially offset to one another by some fraction of a magnetic island dimension.

The pattern 300 also includes a pad pattern 351 comprising a number of radial magnetic columns 301 and radial non magnetic grooves 302. The pad pattern 351 may be used as a read-to-write timing delay buffer between the pattern 300 and subsequent data patterns. Alternatively or additionally, the pad pattern 351 may be used to write additional servo data such as RRO values. The physical dimensions and spacings of the radial magnetic columns 301 in the pad pattern 351 may be different from the magnetic column 301 dimensions elsewhere in the pattern 300.

FIGS. 12-15 illustrate exemplary bootstrap patterns that may be patterned on the magnetic disk 110. As mentioned, the bootstrap pattern has servo data pre-patterned into the magnetic disk 110 to facilitate subsequent servo writing. The bootstrap patterns may include pre-patterned servo sync patterns, SAM patterns, gray code track-ID patterns, sector-ID patterns, and burst patterns that do not all comply with the planarization constraints. With this pre-patterning, the bootstrap patterns are operational after bulk DC magnetization of the magnetic disk 110.

Figure 12:
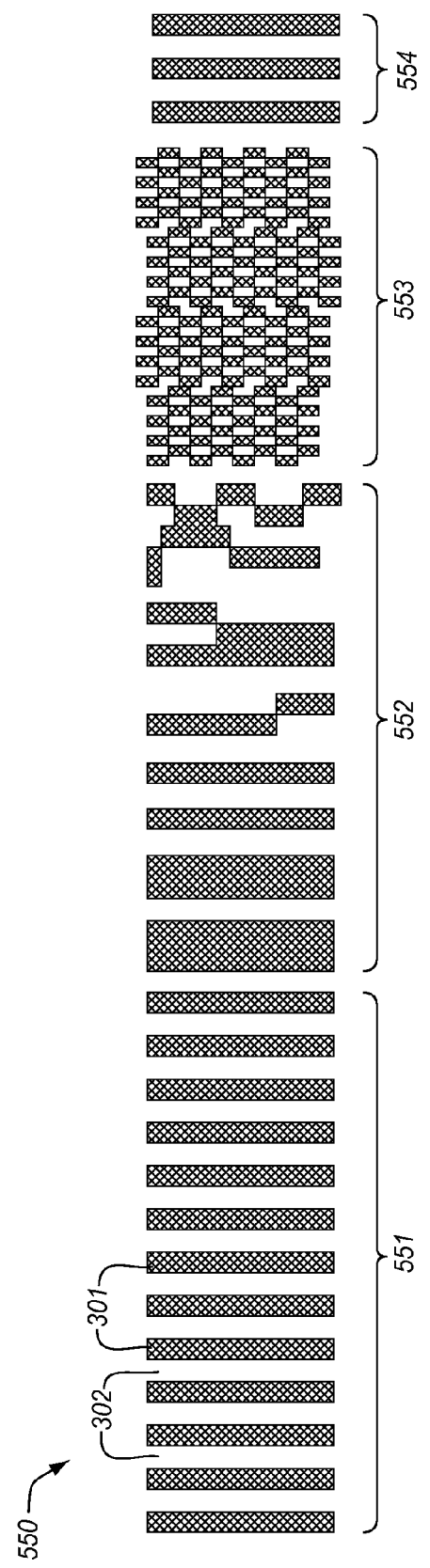
FIGS. 12-15 illustrate exemplary embodiments of bootstrap patterns.

In FIG. 12, much of the bootstrap pattern 550 does not comply with planarization constraints. The 552 area for instance can include SAM patterns, gray code track-ID patterns, and sector-ID patterns that are irregular in shape and do not comply with planarization constraints. The burst pattern 553 can be designed in a checkerboard pattern that is more likely to comply with planarization constraints. In FIG. 12 there are four checkboard sub-patterns but two or three sub-patterns can also be used. The servo sync pattern 551 and pad pattern 554 (which include a plurality of radial magnetic columns 301 and radial non magnetic grooves 302) can more easily comply with planarization constraints due to their repetitive pattern. The bootstrap pattern 550 is operational after bulk DC magnetization of the magnetic disk 110.

Figure 13:
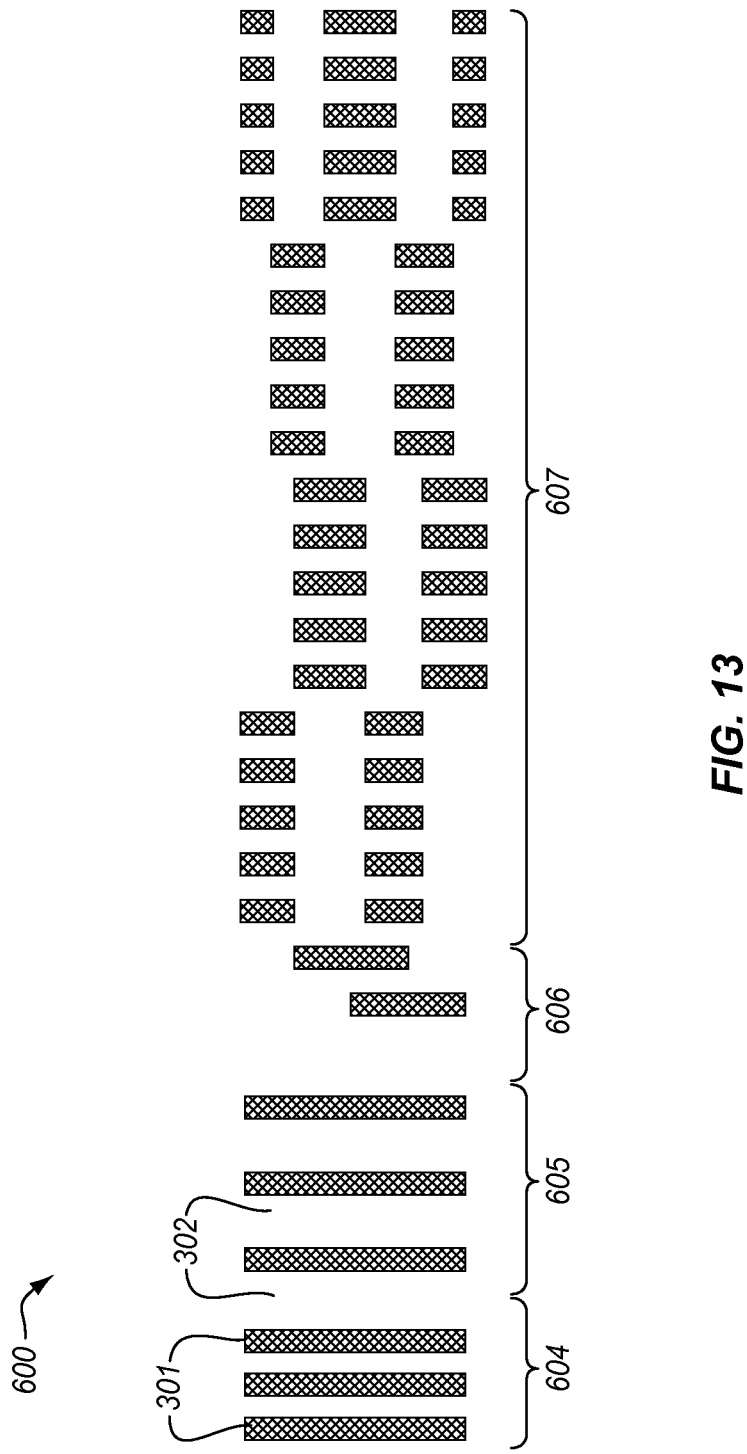

FIG. 13 illustrates another bootstrap pattern 600 with an ABCD pattern 607. In this embodiment, a series of radial magnetic columns 301 and radial non magnetic grooves 302 provide a servo sync pattern 604, a SAM pattern 605, a gray code track-ID pattern 606, and an ABCD pattern 607. The bootstrap pattern 600 is operational after bulk DC magnetization of the magnetic disk.

Figure 14:
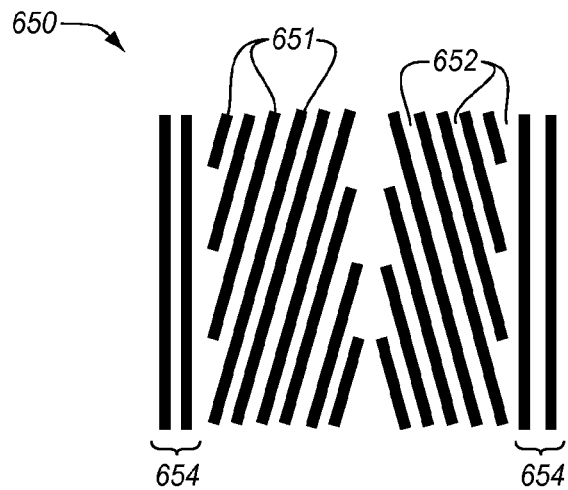
Figure 15:
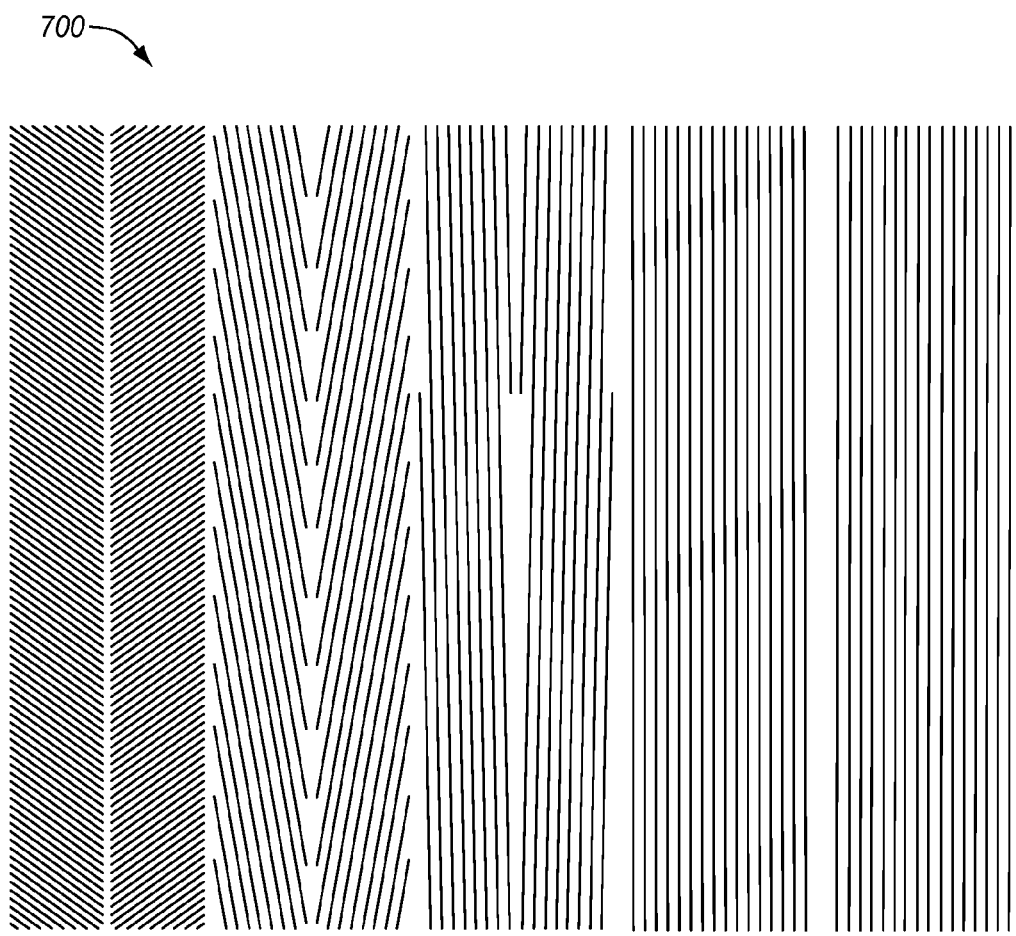

Bootstrap patterns 650 and 700 (of FIGS. 14 and 15, respectively) are designed to better comply with the planarization constraints. In each of these embodiments, the bootstrap patterns 650 and 700 are configured with phase patterns. FIG. 14 has sets of radial magnetic columns 654 bookending the phase patterns. The phase patterns have magnetic columns 651 and non magnetic grooves 652 which make acute angles to the radial direction and look like chevrons. The sets of radial magnetic columns 654 at the start the bootstrap pattern 650 can function as a SAM pattern. The phase patterns of FIG. 14 can be used similar to other burst patterns (such as ABCD patterns or checkerboard sub-patterns) to determine fractions of a track width. FIG. 15 is illustrated with five sets of phase patterns, which provide additional track-ID servo data, similar to the use of gray code track-ID patterns. See FIGS. 4A, 4B, 8, and 10 of the '240 for alternative designs.

Figure 16:
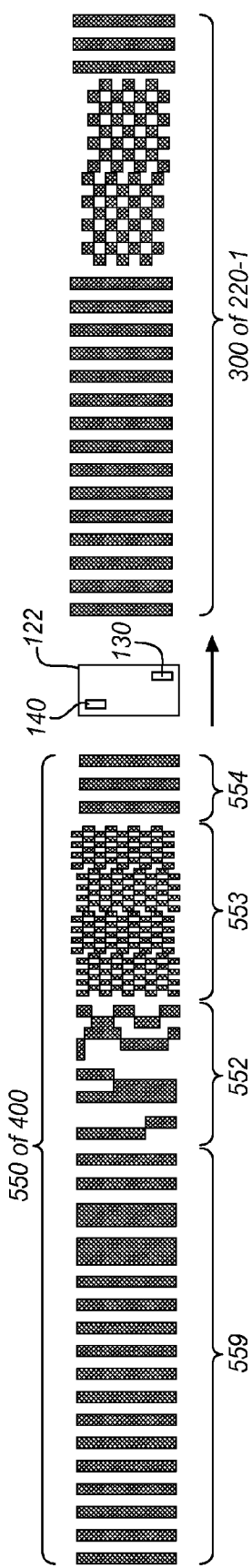
FIG. 16 illustrates the slider's RWO and servo writing while track following on a DC-magnetized bootstrap pattern in an exemplary embodiment.
Figure 17:
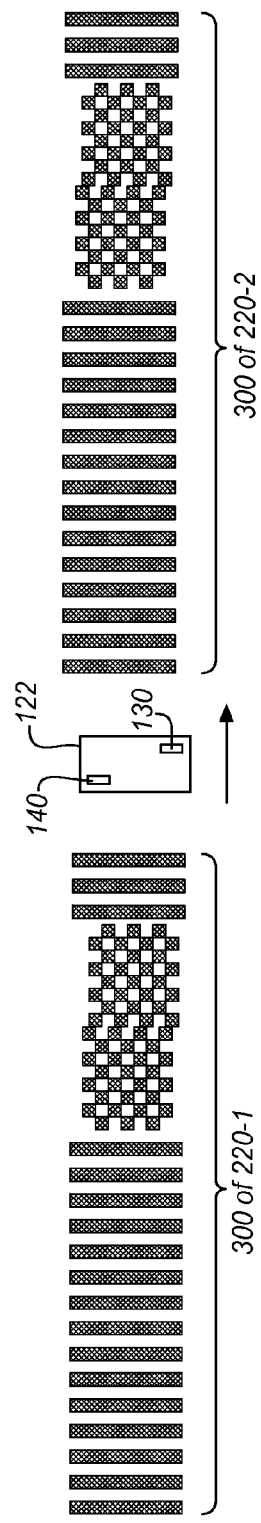
FIG. 17 illustrates the slider's RWO and servo writing while track following on the servo data written into an odd servo sector to write servo data into an even servo sector.

FIGS. 16 and 17 illustrate servo writing via a bootstrap pattern 550 in an exemplary embodiment. In this embodiment, the bootstrap pattern 550 has pre-patterned servo sync patterns and SAM patterns 559, sector-ID and track-ID patterns 552, checkboard sub-patterns 553, and a pad pattern 554. The SAM pattern, sector-ID pattern, and the track-ID pattern need not comply with planarization constraints. With this pre-patterning, the bootstrap patterns are operational after bulk DC magnetization of the magnetic disk 110. The bootstrap pattern 550 may be patterned within a bootstrap zone 400 near the inner diameter of the magnetic disk 110, as illustrated in FIG. 6. The bootstrap pattern 550 may also be patterned within any of the bootstrap zones illustrated in FIG. 10 items 270-1-3 and 400. In both FIGS. 6 and 10, the bootstrap zone 400 near the inner diameter of the magnetic disk 110 includes both bootstrap patterns and overlap patterns. During servo writing, the read head 130 on the slider 122 can track follow on the bootstrap patterns 550 (that have been DC magnetized) and write servo data into the patterns 300 of servo sectors 220 using the write head 140 on the slider 122. As illustrated in FIG. 17, the read head 130 can track follow on the servo data previously written into the pattern 300 of an odd servo sector 220-1 to write servo data into the pattern 300 of an even servo sector 220-2 using the write head 140 on the slider 122. The servo sectors 220 may alternate between "odd" and "even" as demonstrated in FIGS. 6 and 10. The drive electronics interpret the slider's 122 position from the read signal from the read head 130, adjusts the position of the slider 122 over the magnetic disk 110, and controls the write signal to the write head 140. Note that the RWO between the read head 130 and the write head 140 results in the writing of servo data into a different track than the track that is read for track following. This RWO allows the controller 170 to stepwise propagate the servo data writing from the inner diameter of the magnetic disk 110 to the outer diameter by track following on previously written servo data read by the offset read head 130.

Radial Overlap Lengths of Overlap Zones

It is likely desirable to not place user data within the overlap zones. Bootstrap patterns, for instance, are place between servo sectors (a region normally reserved for user-data) and would likely disrupt the normal data layout architecture. Dual frequencies, for instance, would create greater complexity for the servo control electronics. This increased complexity may only be manageable during the servo writing process at the manufacturing site where additional processing power and time can be allocated. If no data is placed into the overlap zones, less real estate is available on the magnetic disk 110 for data patterns. To avoid substantial losses to data capacity for the magnetic disk 110, the radial overlap length of the overlap zones can be minimized A primary factor for the radial overlap length of the overlap zones is the RWO.

In the FIG. 6 embodiment, the overlap zones are dual frequency zones. In the FIG. 10 embodiment, the overlap zones are bootstrap zones. For both embodiments, a first set of servo data is read for track following to write a second set of servo data. In the dual frequency zones, servo data is first written to the first set of overlap patterns (such as the lower frequency overlap patterns of the odd servo sectors 220-1 and 220-3) then used for track following to write servo data into the second set of overlap patterns (such as the higher frequency overlap patterns of the even servo sectors 220-2). In the bootstrap zone embodiment of FIG. 10, the bootstrap patterns (after DC magnetization) are used for track following to write the overlap patterns. In either embodiment, aggressive decreases to the radial overlap length of the overlap zone may at some point result in reliability issues during the servo writing process. Sliders with larger RWO will likely require overlap zones with longer radial overlap lengths and sliders with smaller RWO will likely enable overlap zones with shorter radial overlap lengths.

Figure 18C:
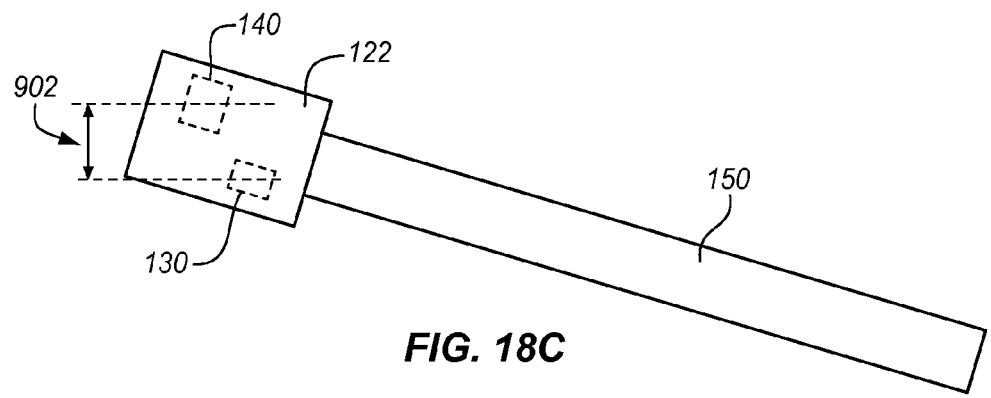
FIGS. 18A-18C illustrate a close-up view of a slider's variable angular position with its associated changes to RWO in an exemplary embodiment.
Figure 18B:
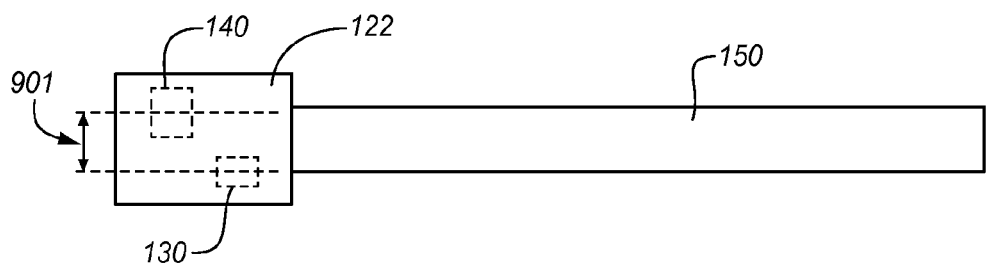
Figure 18A:
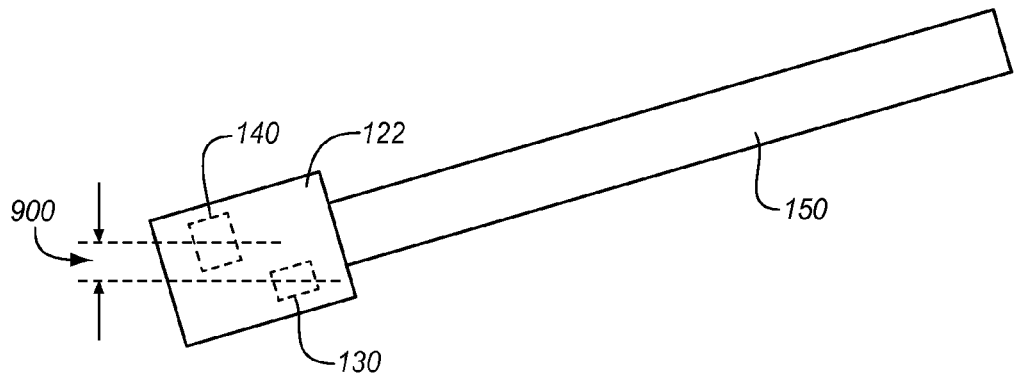

In one embodiment, all the overlap zones 270 may be configured with a radial distance that is at least greater than or equal to the maximum RWO 902 of the slider 122 for all radial locations of the magnetic disk 110. For the rough dimensions shown in FIGS. 18A-C, the radial overlap length of every overlap zone would be greater than or equal to the RWO of FIG. 18C. A substantially constant radial overlap length for every overlap zone can simplify the design of the magnetic disk 110, but could reduce slightly the data capacity of the disk drive device 100. A substantially constant radial length can be used on just one side of each magnetic disk 110 or both sides of each magnetic disk 110. The substantially constant radial overlap length should be greater than the maximum RWO for any of the overlap zones 270 on each side of the magnetic disk 110 and/or on both sides of the magnetic disk 110. In an alternative embodiment, the radial overlap length of each overlap zone 270 may be individually configured based on the RWO at the radius of each overlap zone. For example considering FIGS. 18A-C, the overlap zones 270 closer to the inner diameter of the magnetic disk 110 may be configured with shorter radial overlap lengths than the overlap zones 270 that are nearer the outer diameter.

Radial Lengths of Servo Zones

Another consideration regarding the layout of servo zones 230 and overlap zones 270 involves the geometry of the magnetic disk 110. Near the inner diameter, for instance, the circumference of a track will double when the radius increases from one centimeter to two centimeters. Near the middle diameter of the magnetic disk 110, the circumference of a track will only increase 50% when the radius increases from two centimeters to three centimeters. Near the outer diameter of the magnetic disk 110, the circumference of a track will only increase by 25% when the radius increases from four centimeters to five centimeters. If the planarization constraints allow a maximum 25% deviation within a servo zone 230, then near the outer diameter of the magnetic disk 110 the maximum servo zone 230 radial length can be about one centimeter. However, near the inner diameter of the magnetic disk 110, a maximum 25% deviation would limit the maximum servo zone 230 radial length to about 2.5 milimeters. Near the middle diameter of the magnetic disk 110, a maximum 25% deviation would limit the maximum servo zone 230 radial length to about five millimeters.

Figure 19:
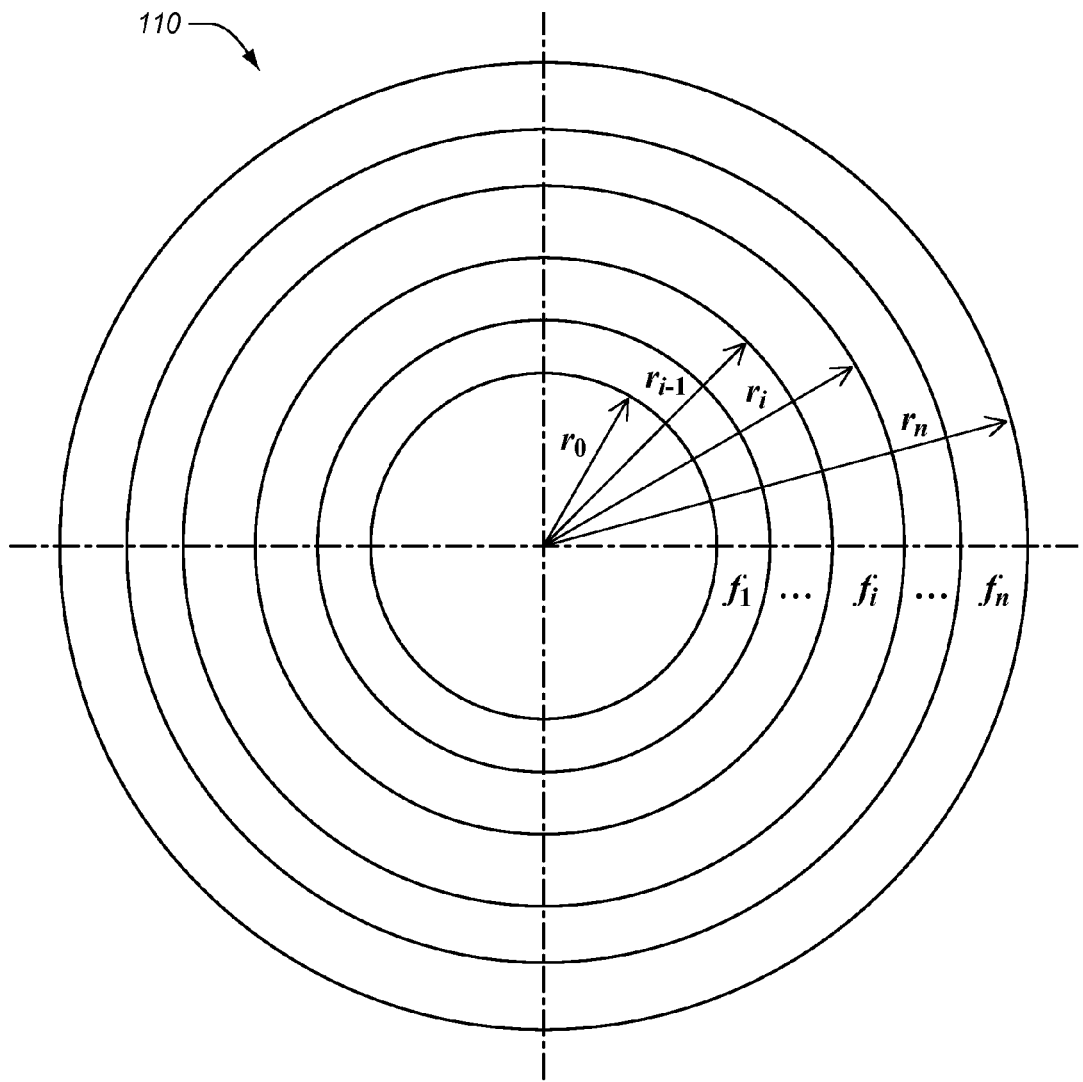
FIGS. 19, 20A, and 20B illustrate the variables and calculations used to determine optimal radial dimensions of servo zones in an exemplary embodiment.

FIG. 19 illustrates the magnetic disk 110 with radial dimension and zone frequency considerations of servo zones 230 that are used to compute servo zone radial lengths in an exemplary embodiment. For example, the design parameters used in constructing the servo patterns include the servo frequency $f_i$ (i=1 . . . n, where n is simply used herein as an integer greater than 1, but not to designate actual frequency) of the servo zone 230 based on its radial dimension $r_i$ (i=0 . . . n) on the magnetic disk 110.

To conform to the various planarization constraints described above (e.g., the Dry Planarization Design Rules #1 and #2), the widths of data tracks and/or non magnetic grooves separating those tracks may increase (e.g., increased track pitch, $T_p$). A similar consideration is the changing "pitch" of the servo patterns within the servo zones 230. In this regard, the maximum circumferential pitch difference may be calculated as (maximum $C_p$–minimum $C_p$). Other factors to consider are the number of zones n on the magnetic disk 110, the revolution N of the magnetic disk 110, the innermost radius $r_0$ of the magnetic disk 110, and the outermost radius $r_n$ of the magnetic disk 110. Generally, to comply with planarization constraints, the preamble pitch of a servo pattern is configured as $C_p=2\pi rN/f$, where the minimum circumferential pitch $C_p$ value is same for each servo zone 230 and the maximum circumferential pitch $C_p$ value is same for each servo zone 230. To conform to the land/groove dimension ratios of the Dry Planarization Design Rule #1 at data and servo zones, boundary conditions for the servo zones 230 are generally configured as the minimum $C_p=T_p$, which provides suitable fly high control of the slider 122. In this regard, the maximum $C_p=T_p$ and [(maximum $C_p$)–(minimum $C_p$)]/2+ (minimum $C_p$)=$T_p$.

With these concepts in mind, the following mathematical relationships may exist (e.g., without yet considering the overlap zones 270):

$$C_p(f, r) = \frac{2\pi rN}{f}$$

-continued $$\frac{r_0}{f_1} = \ldots = \frac{r_{i-1}}{f_i} = \ldots = \frac{r_{n-1}}{f_n} = \frac{\min C_p}{2\pi N} = \frac{T_p}{2\pi N}$$

$$\frac{r_1}{f_1} = \ldots = \frac{r_i}{f_i} = \ldots = \frac{r_n}{f_n} = \frac{\max C_p}{2\pi N}$$

$$r_i = (r_0^{n-i} r_n^i)^{\frac{1}{n}}$$

$$f_i = \frac{2\pi N}{T_p} r_{i-1} = \frac{2\pi N}{T_p} (r_0^{n-i+1} r_n^{i-1})^{\frac{1}{n}}$$

and $$\max C_p = 2\pi N \frac{r_i}{f_i} = \frac{r_i}{r_{i-1}} T_p = \left(\frac{r_n}{r_0}\right)^{\frac{1}{n}} T_p$$

When the overlap zones 270 of the servo zones 230 comprise a length 2l, boundary conditions are the minimum $C_p=T_p$, with the minimum $C_p$ being same value for each zone servo zone 230. From this, the following may be computed:

$$\frac{r_0}{f_1} = \ldots = \frac{r_{i-1} - l}{f_i} = \ldots = \frac{r_{n-1} - l}{f_n} = \frac{\min C_p}{2\pi N} = \frac{T_p}{2\pi N}$$

The maximum $C_p$ is also same value for each servo zone 230 and can be computed as follows:

$$\frac{r_1 + l}{f_1} = \ldots = \frac{r_i + l}{f_i} = \ldots = \frac{r_n}{f_n} = \frac{\max C_p}{2\pi N}$$

Figure 20A:
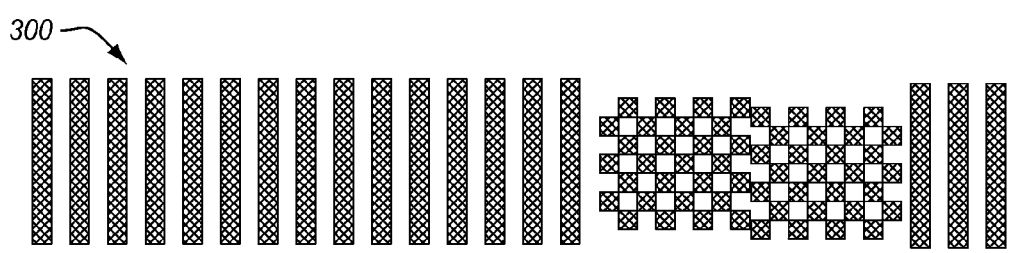
Figure 20B:
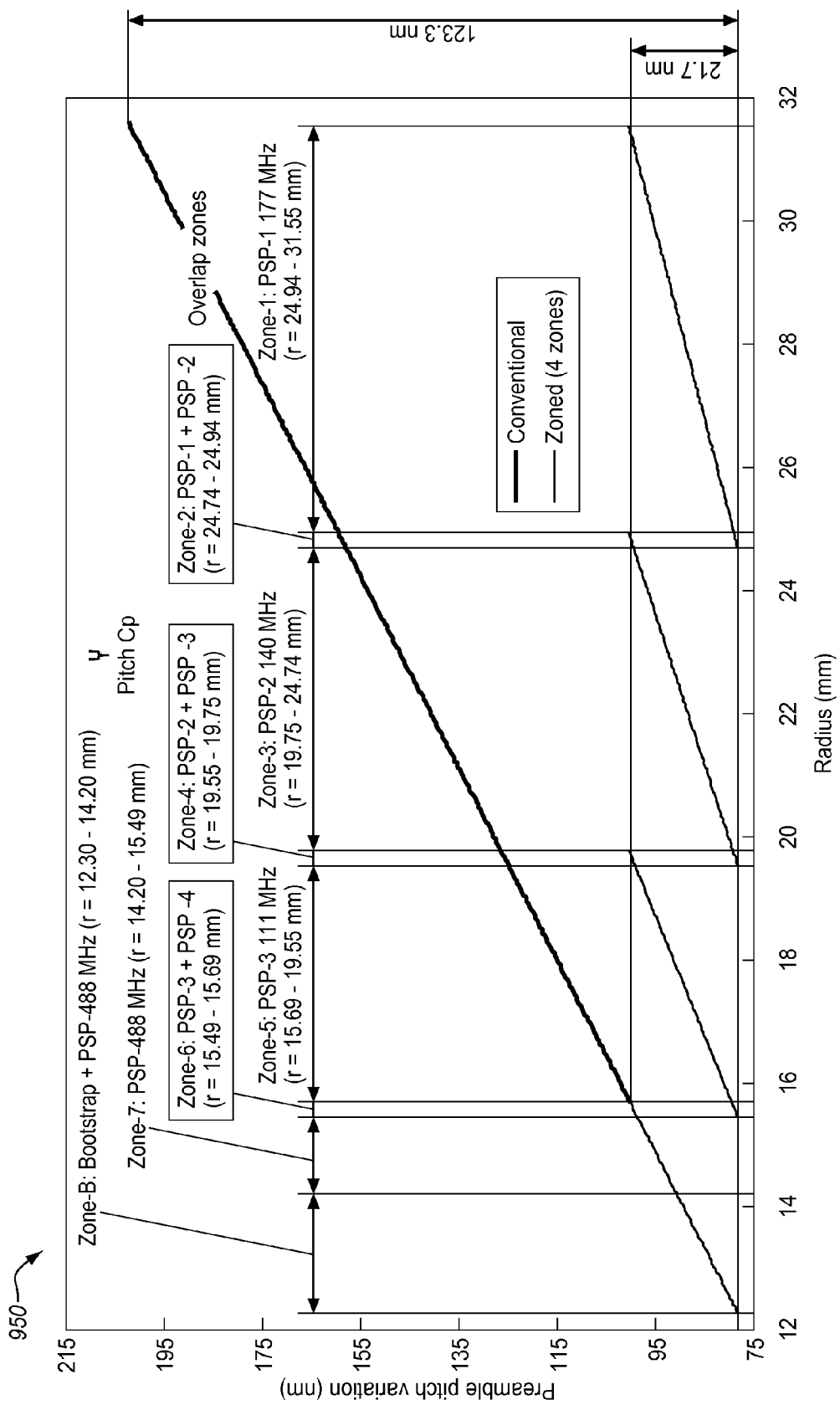

Simple solutions to the sizing and pitch considerations of the servo zones 230, the servo patterns therein, and the overlap zones 270 do not generally exist. However, these may be characterized in the following pattern 300 and graph 950 illustrated in FIGS. 20A and 20B respectively. The graph 950 illustrates the changing pitch and radial dimension of the pattern 300 based on its particular location on the magnetic disk 110 (e.g., within a particular servo zone 230). In FIG. 20B, a bootstrap zone (Zone-B) and a series of alternating servo zones 230 (odd numbered zones) and overlap zones 270 (even numbered zones) are configured from the inner diameter of the magnetic disk 110 to the outer diameter according to increasing frequency. In this instance, Zone B is configured closest to the inner diameter the magnetic disk 110 followed by the servo zone 230 labeled "Zone 7", having the lowest servo frequency in this example. In similar fashion, the servo zone 230 labeled "Zone 1" is configured closest to the outer diameter of the magnetic disk 110 and has the highest servo frequency in this example. Assuming that each of the servo zones is configured with the pattern 300 of FIG. 20A, the graph 950 provides an insight as to how the pattern 300 may increase in radial dimension and pitch based on its location within higher frequency servo zones 230. Similar insight can be gained from the graph 950 into the overlap zones 270. While certain dimensions for a particular servo pattern on a magnetic disk are illustrated in the graph 950, the invention is not intended to be limited to any particular dimension or servo pattern. The graph 950 is merely intended to provide one manner in which zoned servo may be sized and implemented.

Extended Sync Patterns

Figure 21:
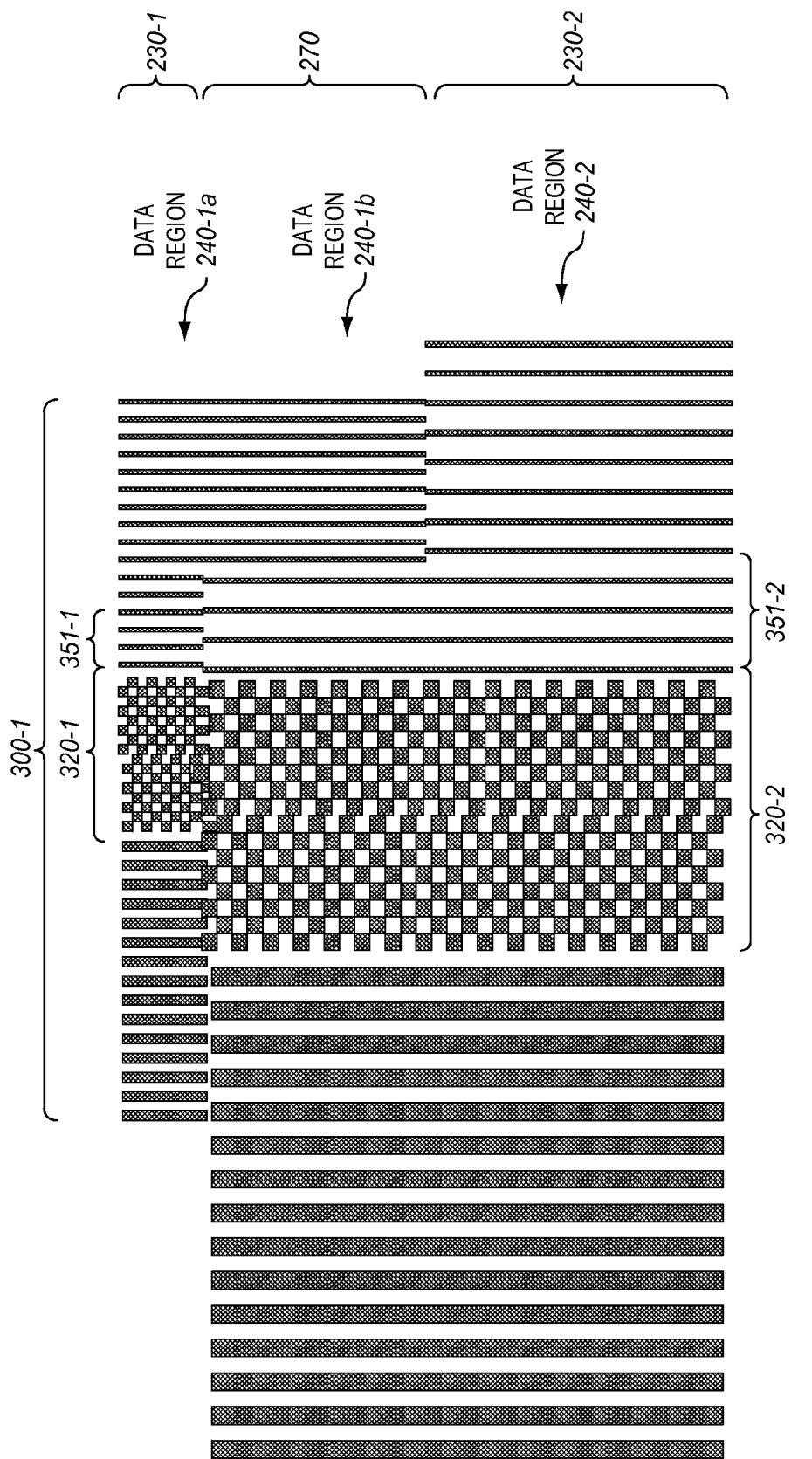
FIG. 21 illustrates a servo zone boundary between higher and lower frequency servo zones with extended sync patterns that provide data clock synchronization in an exemplary embodiment.

FIG. 21 illustrates a boundary area between patterns 300-1 and 300-2 wherein the overlap zone 270 has extended sync patterns. In the servo zone 230-1, pattern 300-1 has a burst pattern 320-1, a pad pattern 351-1, and a data sync pattern (on the leftward portion of the data region 240-1a). In the servo zone 230-2, pattern 300-2 has a burst pattern 320-2, a pad pattern 351-2, and a data sync pattern (on the leftward portion of the data region 240-2). Servo zone 230-1 has a higher servo frequency than the servo zone 230-2. Between the servo zones 230-1 and 230-2 is an overlap zone 270 with an extended sync pattern (on the leftward portion of the data region 240-1b) that is substantially identical in frequency as the data sync pattern in data region 240-1a. Note that, as in FIG. 5, the pad patterns 351-1 and 351-2 end circumferentially at trailing edge of the servo sectors 220; in this manner, pairs of the extended sync patterns of the overlap zone 270 and the data sync patterns in the higher frequency servo zone 230-1 commence circumferentially together along the trailing edge of the servo sectors 220 and align into a set of radial columns. Eg, the servo patterns and the overlap patterns are not aligned necessarily at the leading edge of the servo sectors 220 but are aligned at the trailing edge of the servo sector such that pairs of extended sync patterns and data sync patterns commence circumferentially together as a pair at the trailing edge of the servo sector.

The extended sync pattern enables the read head 130 (which has RWO from the write head 140) to acquire data clock synchronization for writing data in the data region 240-1a. The overlap zone 270 also has overlap patterns that are substantially identical to the servo patterns in servo zone 230-2. Data region 240-1 has a higher frequency than the data region 240-2. As previously mentioned, the overlap zones 270 are generally not used for user data, so the data patterns would normally be limited to data regions 240-1a and 240-2 of FIG. 21. However, to increase data capacity of the magnetic disk 110, the overlap zones 270 can include data patterns, such as in the data region 240-1b of FIG. 21. There may be pairs of extended sync patterns and data sync patterns between the servo sectors 220, as many of the data blocks commence between the servo sectors in typical disk drive device data region layouts and/or are split in two by the servo sectors 220.

Although specific embodiments were described herein, the scope of the invention is not limited to those specific embodiments. The scope of the invention is defined by the following claims and any equivalents thereof.

We claim:
1. A disk drive system comprising:
(a) one or more magnetic disks mounted on a spindle motor,
a plurality of concentric zones comprising an alternating series of servo zones and overlap zones,
wherein the servo frequency of each servo zone is different from the servo frequency of the other servo zones,
wherein the servo zones are patterned from the inner diameter of the one or more magnetic disks to the outer diameter according to increasing servo frequency,
wherein each servo zone comprises a plurality of servo patterns,
wherein each overlap zone comprises a plurality of overlap patterns, and
wherein each overlap zone has a radial overlap length; and
(b) an actuator comprising a pivot point and at least one slider,
wherein each slider has a read head and a write head,
wherein each slider has a radial read-write offset length (RWO) that varies with the radial position of the slider,
wherein each slider has a maximum RWO within each overlap zone, and
wherein the radial overlap length of each overlap zone is greater than the maximum RWO for that overlap zone.

2. The disk drive system of claim 1, wherein the radial overlap lengths vary from the inner diameter of the magnetic disk to the outer diameter.

3. The disk drive system of claim 2, wherein the radial overlap lengths generally decrease in radial length from the inner diameter of the magnetic disk to the outer diameter.

4. The disk drive system of claim 2, wherein the radial overlap lengths generally increase in radial length from the inner diameter of the magnetic disk to the outer diameter.

5. The disk drive system of claim 2,
wherein the radial overlap lengths generally decrease in radial length from a middle diameter of the magnetic disk to the inner diameter, and
wherein the radial overlap lengths generally increase in radial length from the middle diameter to the outer diameter.

6. The disk drive system of claim 2, wherein the radial overlap length of each overlap zone is greater than twice the maximum RWO for that overlap zone.

7. The disk drive system of claim 1, wherein, for each of the overlap zones on one side of each magnetic disk, the radial overlap lengths are substantially constant from the inner diameter of the magnetic disk to the outer diameter.

8. The disk drive system of claim 7, wherein the constant radial overlap length on one side of each magnetic disk is greater than the maximum RWO for any of the overlap zones for that side of the magnetic disk.

9. The disk drive system of claim 7, wherein the constant radial overlap length on one side of each magnetic disk is greater than twice the maximum RWO for any of the overlap zones for that side of the magnetic disk.

10. The disk drive system of claim 1, wherein, for each of the overlap zones on both sides of each magnetic disk, the radial overlap lengths are substantially constant from the inner diameter of the magnetic disk to the outer diameter.

11. The disk drive system of claim 10, wherein the constant radial overlap length on both sides of each magnetic disk is greater than the maximum RWO for any of the overlap zones for that magnetic disk.

12. The disk drive system of claim 10, wherein the constant radial overlap length on both sides of each magnetic disk is greater than twice the maximum RWO for any of the overlap zones for that magnetic disk.

13. The disk drive system of claim 1, wherein the overlap patterns in each overlap zone are patterned with the substantially identical pattern as the servo patterns of the bordering lower frequency servo zone.

14. The disk drive system of claim 1, wherein the overlap patterns in each overlap zone are patterned with the substantially identical pattern as the servo patterns of the bordering higher frequency servo zone.

15. The disk drive system of claim 1, wherein the overlap patterns in each overlap zone are patterned with the substantially identical frequency as the servo patterns of the bordering lower frequency servo zone.

16. The disk drive system of claim 1, wherein the overlap patterns in each overlap zone are patterned with the substantially identical frequency as the servo patterns of the bordering higher frequency servo zone.

17. The disk drive system of claim 1,
wherein the overlap patterns in each overlap zone comprise a first and second subset,
wherein the first subset is patterned with the substantially identical pattern as the servo patterns of the bordering lower frequency servo zone, and
wherein the second subset is patterned with the substantially identical pattern as the servo patterns of the bordering higher frequency servo zone.

18. The disk drive system of claim 1,
wherein the overlap patterns in each overlap zone comprise a first and second subset,
wherein the first subset is patterned with the substantially identical frequency as the servo patterns of the bordering lower frequency servo zone, and
wherein the second subset is patterned with the substantially identical frequency as the servo patterns of the bordering higher frequency servo zone.

19. The disk drive system of claim 1, wherein the overlap patterns in each overlap zone are circumferentially aligned with the servo patterns in the bordering lower frequency servo zone.

20. The disk drive system of claim 1, wherein the overlap patterns in each overlap zone are circumferentially aligned with the servo patterns in the bordering higher frequency servo zone.

21. The disk drive system of claim 1, wherein the servo zones generally increase in radial length from the inner diameter of the magnetic disk to the outer diameter.

22. The disk drive system of claim 1, wherein, within each servo zone, the servo patterns comprise radial magnetic columns and radial non-magnetic grooves having widths that establish servo frequency for the servo zone.

23. The disk drive system of claim 22,
wherein the overlap zones are comprised of a plurality of bootstrap patterns, and
wherein the bootstrap patterns are patterned between the servo sectors within each overlap zone.

24. The disk drive system of claim 22,
wherein the overlap zones are comprised of a plurality of bootstrap patterns and overlap patterns, and
wherein the bootstrap patterns are patterned within alternating servo sectors of each overlap zone.

\* \* \* \* \*